United States Patent [19]
Okada et al.

[11] Patent Number: 5,095,798
[45] Date of Patent: Mar. 17, 1992

[54] ELECTRONIC GAMING DEVICE WITH PSEUDO-STEREOPHONIC SOUND GENERATING CAPABILITIES

[75] Inventors: Saturo Okada; Hirokazu Tanaka, both of Kyoto, Japan

[73] Assignee: Nintendo Co. Ltd., Kyoto, Japan

[21] Appl. No.: 462,491

[22] Filed: Jan. 8, 1990

[30] Foreign Application Priority Data

Jan. 10, 1989 [JP] Japan ................. 1-2007
Jan. 10, 1989 [JP] Japan ................. 1-4453
Apr. 20, 1989 [JP] Japan ................. 1-101027

[51] Int. Cl.⁵ .................... A63F 9/24; G10H 1/26; G10H 7/00
[52] U.S. Cl. ..................... 84/609; 84/DIG. 27; 273/85 G; 273/435; 364/410; 381/17
[58] Field of Search ............... 84/609–614, 84/634–638, DIG. 1, DIG. 27; 381/1, 61, 118, 17; 273/85 G, 435, 436; 364/410

[56] References Cited

U.S. PATENT DOCUMENTS

| | | | |
|---|---|---|---|
| 3,560,656 | 2/1971 | Gilbert | 179/1 |
| 3,647,928 | 3/1972 | Turner | 84/DIG. 27 |
| 3,818,115 | 6/1974 | Hirano | 84/DIG. 27 |
| 4,308,424 | 12/1981 | Bice, Jr. | 179/1 |
| 4,347,405 | 8/1982 | Davis | 84/DIG. 27 |
| 4,614,144 | 9/1986 | Sagara et al. | 84/DIG. 1 |
| 4,685,134 | 8/1987 | Wire . | |
| 4,792,974 | 12/1988 | Chace | 381/1 |
| 4,817,149 | 3/1989 | Myers | 381/1 |

FOREIGN PATENT DOCUMENTS

| | | |
|---|---|---|
| 0217668 | 4/1987 | European Pat. Off. . |
| 0268419 | 5/1988 | European Pat. Off. . |
| 2481559 | 10/1981 | France . |
| 62-155879 | 2/1987 | Japan . |
| 62-277981 | 3/1987 | Japan . |
| 62-155880 | 5/1987 | Japan . |
| 2033763 | 5/1980 | United Kingdom . |

Primary Examiner—Stanley J. Witkowski
Attorney, Agent, or Firm—Nixon & Vanderhye

[57] ABSTRACT

An electronic gaming (e.g., video game) device includes a pseudo-stereo sound generator. Plural independent sound generating circuits produce audio signals under microcomputer control. The microcomputer may route the outputs of the plural sound generating circuits independently to one or the other (or both) of two independent audio channel outputs so as to produce pseudo-stereo sound. A selecting circuit automatically mixes the two audio channel outputs together and provides them in monaural form to an internal loudspeaker when no stereophonic headset is connected. A microcomputer controls generation of sounds and music in accordance with a musical pitch (frequency) data structure, a musical duration data structure and a musical score data structure stored in an interchangeable memory cartridge. The musical score data structure specifies pitch and duration in terms of address offsets into pitch and duration data structures.

22 Claims, 18 Drawing Sheets

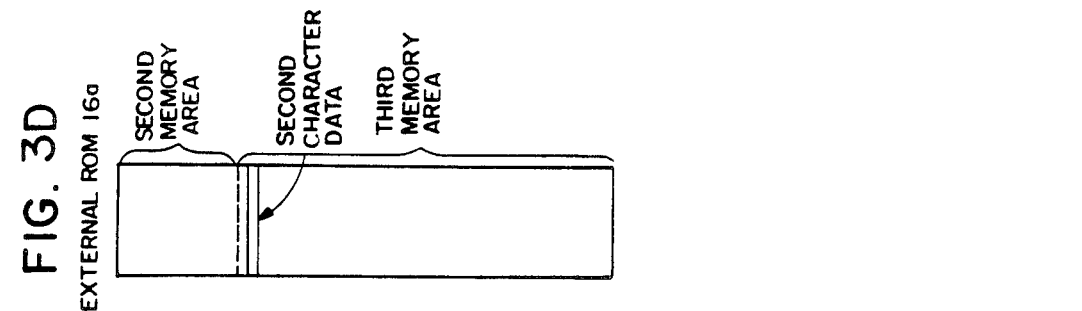
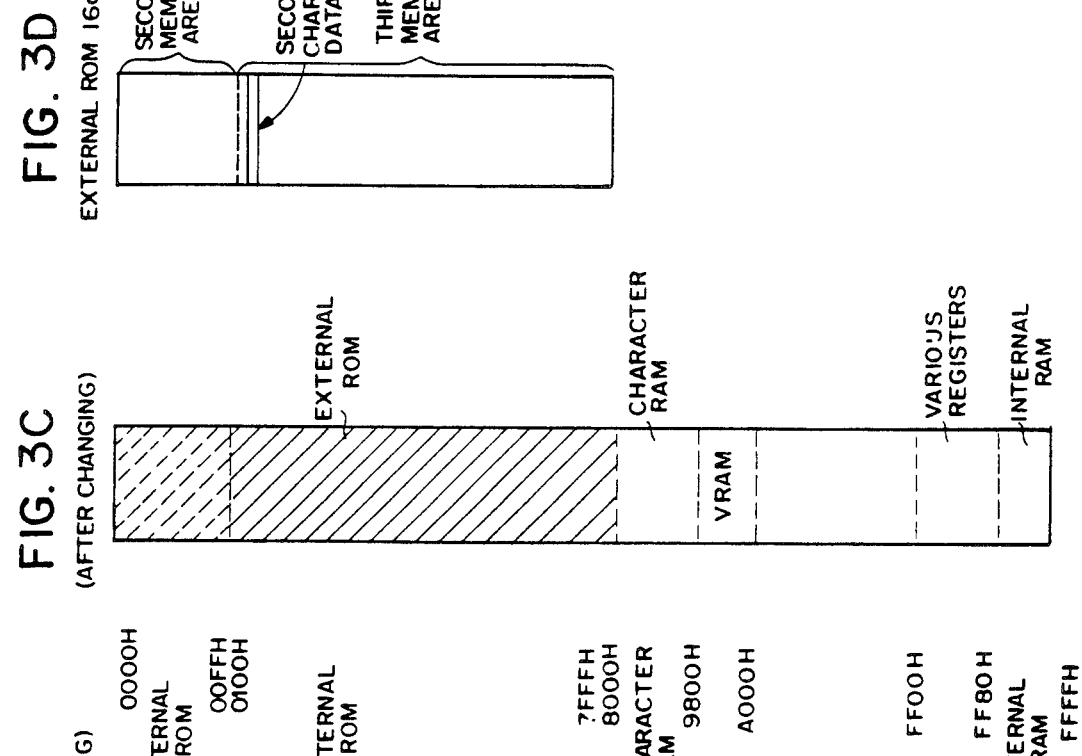
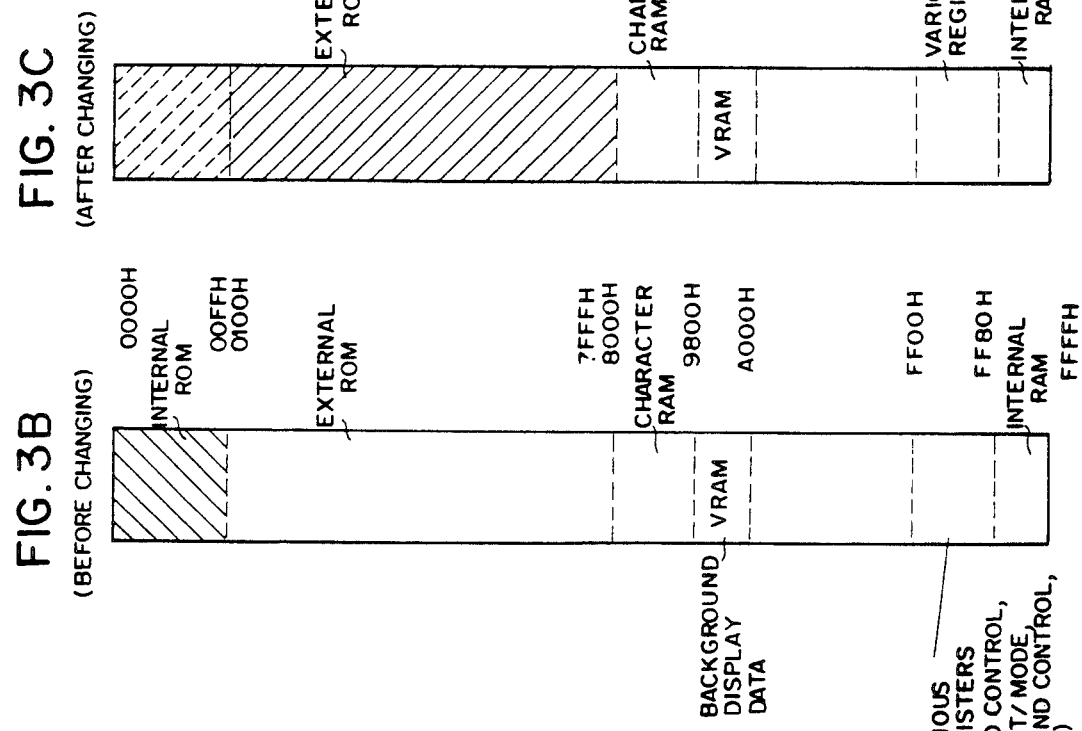
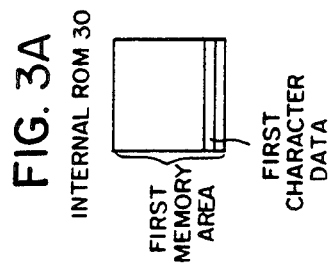

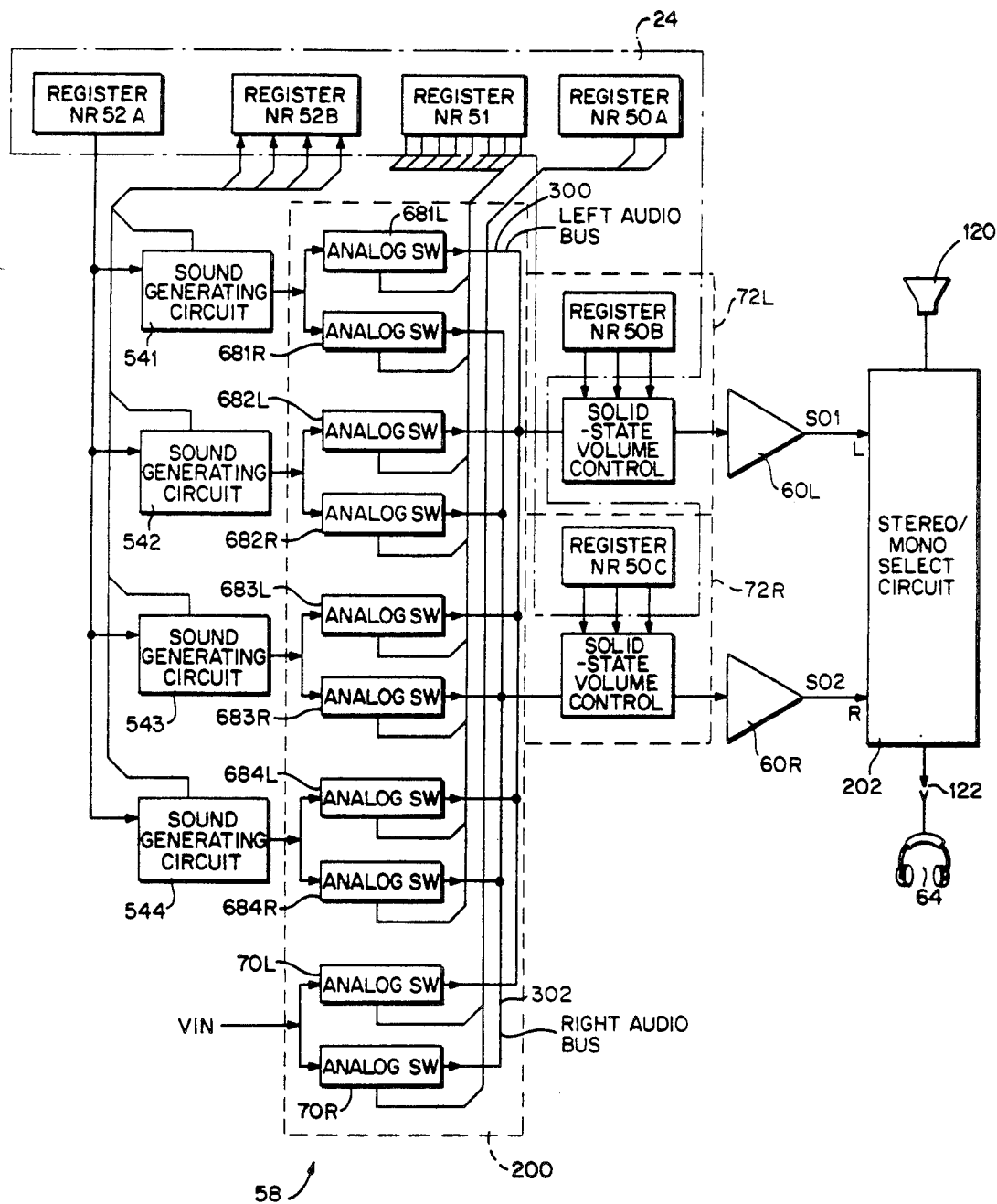
FIG. 4 SOUND GENERATOR

| REGISTER | ADDRESS | D7 | D6 | D5 | D4 | D3 | D2 | D1 | D0 |
|---|---|---|---|---|---|---|---|---|---|
| NR 50 SO1/SO2 LEVEL | FF 24 | VIN INPUT 0:OFF 1:TO SO2 | SO2 OUTPUT LEVEL CONTROL FROM 000:(MIN) TO 111:(MAX) | | | VIN INPUT 0:OFF 1:TO SO1 | SO1 OUTPUT LEVEL CONTROL FROM 000:(MIN) TO 111:(MAX) | | |
| NR 51 SO1/SO2 ASSIGNMENT | FF 25 | ASSIGN SOUND-4 TO SO2 | ASSIGN SOUND-3 TO SO2 | ASSIGN SOUND-2 TO SO2 | ASSIGN SOUND-1 TO SO2 | ASSIGN SOUND-4 TO SO1 | ASSIGN SOUND-3 TO SO1 | ASSIGN SOUND-2 TO SO1 | ASSIGN SOUND-1 TO SO1 |
| NR 52 SOUND END FLAG | FF 26 | ALL SOUND 0: STOP 1: START | / | / | / | SOUND-4 ON-FLAG | SOUND-3 ON-FLAG | SOUND-2 ON-FLAG | SOUND-1 ON-FLAG |

SOUND CONTROL

FIG. 4A

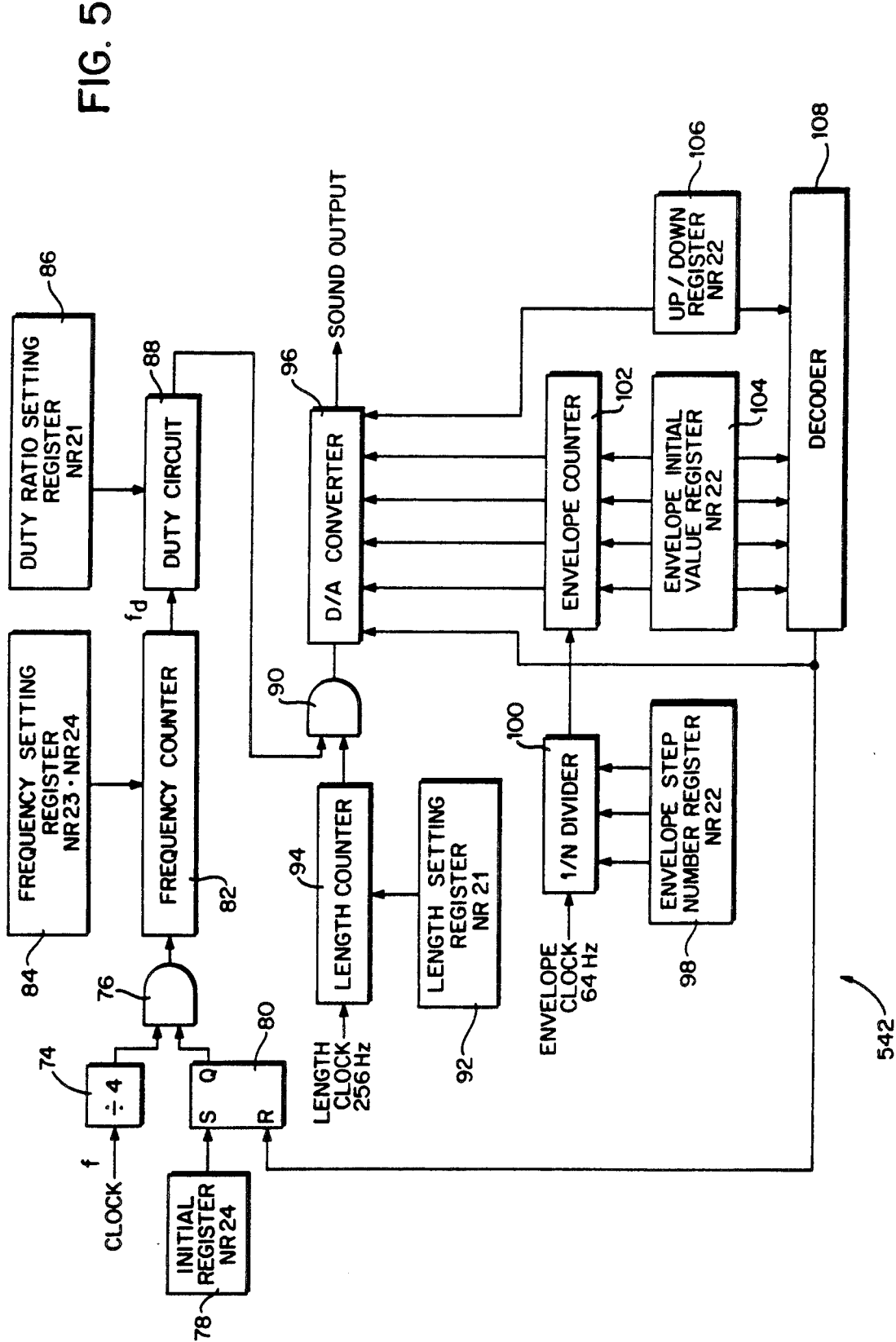

| | REGISTER | ADDRESS | D7 | D6 | D5 | D4 | D3 | D2 | D1 | D0 |
|---|---|---|---|---|---|---|---|---|---|---|
| S O U N D 1 | NR 10 SWEEP | FF 10 | | SWEEP TIME 000:OFF 001:7.8ms 010:15.6ms 011:23.4ms 100:31.3ms 101:39.1ms 110:46.9ms 111:54.7ms | | | SWEEP 0: +f hi 1: -f low | NUMBER OF SWEEP SHIFT: 0-7 | | |
| | NR 11 DUTY/ SOUND LENGTH | FF 11 | WAVE FORM DUTY 00: 12.5% 00: 50% 01: 25% 11: 75% | | SOUND LENGTH DATA   t1 : 0 - 63 SOUND LENGTH = (64 - t1) × (1/256)sec | | | | | |
| | NR 12 ENVELOPE | FF 12 | ENVELOPE INITIAL VALUE 0 - FH 0 : NO SOUND F : MAXIMUM | | | | ENVELOPE 0:ATTENUAT 1:AMPLIFY | NUMBER OF ENVELOPE STEP (N):0-7 LENGTH OF 1-STEP = N × (1/64)sec N=0: STOP ENVELOPE OPERATION | | |
| | NR 13 FREQUENCY LOWER DATA | FF 13 | FREQUENCY LOWER DATA  8-BIT | | | | | | | |
| | NR 14 FREQUENCY UPPER/.ETC | FF 14 | INITIAL FLAG 1:RESTART | LENGTH 0:CONTINUE 1: NR 11 | | | | FREQUENCY UPPER DATA 3-BIT IF X IS 11-BIT AS FREQUENCY DATA f=4194304/(4×2³(2048-X))Hz | | |

FIG. 5A

| REGISTER | ADDRESS | D7 | D6 | D5 | D4 | D3 | D2 | D1 | D0 |
|---|---|---|---|---|---|---|---|---|---|
| NR 21 SOUND /SOUND L | FF 16 | WAVE FORM DUTY 00:12.5% 00:50% 01:25% 11:75% | | SOUND LENGTH t1:0-63 SOUND LENGTH = (64-t1)×(1/256)sec | | | | | |
| NR 22 ENVELOPE | FF 17 | ENVELOPE INITIAL VALUE 0-FH 0: NONE F: MAXIMUM | | | | ENVELOPE 0:ATTENUAT 1:AMPLIFY | ENVELOPE STEP NUMBER N 0-7 LENGTH OF 1-STEP = N×(1/64)sec N=0:STOP ENVELOPE OPERATION | | |
| NR 23 FREQUENCY LOWER DATA | FF 18 | FREQUENCY LOWER DATA 8-BIT | | | | | | | |
| NR 24 FREQUENCY UPPER/..ETC | FF 19 | INIT. FLAG 1: RESTART | LENGTH 0:CONTINUE 1:NR 21 | | | | FREQUENCY UPPER DATA 3-BIT IF X IS 11-BIT AS FREQUENCY DATA $f = 4194304/(4 \times 2^3(2048-X))$ Hz | | |

| | REGISTER | ADDRESS | D7 | D6 | D5 | D4 | D3 | D2 | D1 | D0 |
|---|---|---|---|---|---|---|---|---|---|---|
| SOUND 3 | NR 30 SOUND OFF | FF 1A | SOUND OFF 0: OFF 1: ON | / | / | / | / | / | / | / |
| | NR 31 SOUND LENGTH | FF 1B | across D7–D0: SOUND LENGTH DATA t1: 0–255 / SOUND LENGTH = (256−t1)×(1/256)sec | | | | | | | |
| | NR 32 OUTPUT LEVEL | FF 1C | / | OUTPUT LEVEL 00: NONE 10: 1/2 01: MAX 11: 1/4 | | / | / | / | / | / |
| | NR 33 FREQUENCY LOWER DATA | FF 1D | across D7–D0: FREQUENCY LOWER DATA-BIT | | | | | | | |
| | NR 34 FREQUENCY UPPER/.ETC | FF 1E | INITIAL FLAG 1: RESTART | LENGTH 0: CONTINUE 1: NR 31 | / | / | / | D2–D0: FREQUENCY UPPER DATA 3-BIT / IF X IS 11-BIT AS FREQUENCY DATA f=4194304/(4×2³(2048−X))Hz | | |

FIG. 5D

| REGISTER | ADDRESS | D7 | D6 | D5 | D4 | D3 | D2 | D1 | D0 |
|---|---|---|---|---|---|---|---|---|---|
| NR 41<br>SOUND<br>LENGTH | FF 20 | | | SOUND LENGTH DATA t1:0-63<br>SOUND LENGTH = (64-t1)×(1/256)sec | | | | | |
| NR 42<br>ENVELOPE | FF 21 | ENVELOPE INITIAL VALUE 0 - FH<br>0 : NONE<br>F : MAX | | | | ENVELOPE<br>0:ATTENUAT<br>1:AMPLIFIC | ENVELOPE STEP NUMBER N 0 - 7<br>LENGTH OF 1-STEP = N×(1/64)sec<br>N=0: STOP ENVELOPE OPERATION | | |
| NR 43<br>POLYNOMIAL<br>COUNTER | FF 22 | POLYNOMIAL COUNTER CLOCK  PROHIBITED<br>FREQUENCY SELECTION           CODE<br>0000:$f_b$×1/2      1100:$f_b$×1/$2^{13}$   1110<br>0001:$f_b$×1/$2^2$ FROM 1101:$f_b$×1/$2^{14}$  1111 | | | | # OF STEPS<br>0:15<br>1: 7 | DIVIDING RATIO FREQUENCY $f_b$<br>SELECTION<br>000:f×1/$2^3$×2      110:f×1/$2^3$×1/6<br>001:f×1/$2^3$×1/1 FROM 111:f×1/$2^3$×1/7 | | |
| NR 44<br>INITIAL<br>LENGTH | FF 23 | INITIAL  LENGTH<br>FLAG    0:CONTINUE<br>1:RESTART  1:NR 11 | | | | | | | |

SOUND 4

FIG. 6
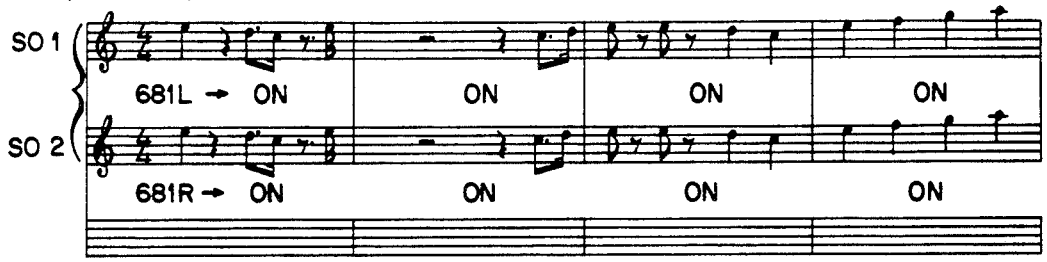
(SOUND 1) MELODY
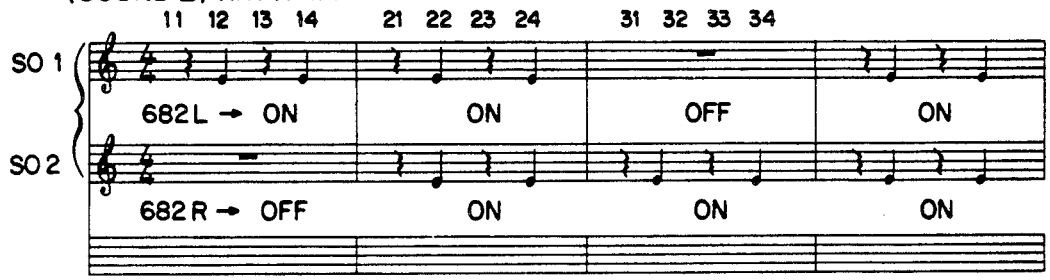
(SOUND 2) RHYTHM 1
(SOUND 3) RHYTHM 2
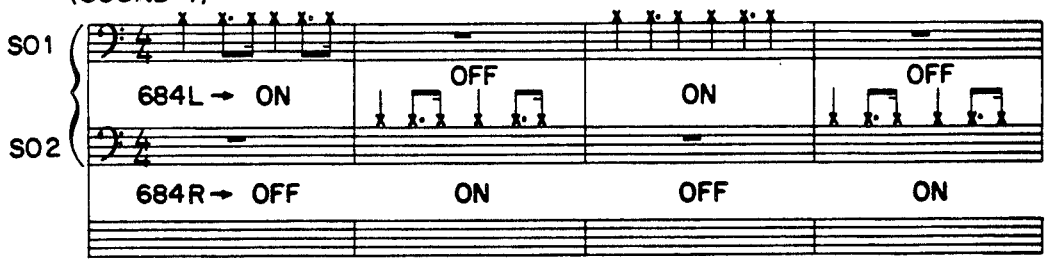
(SOUND 4)

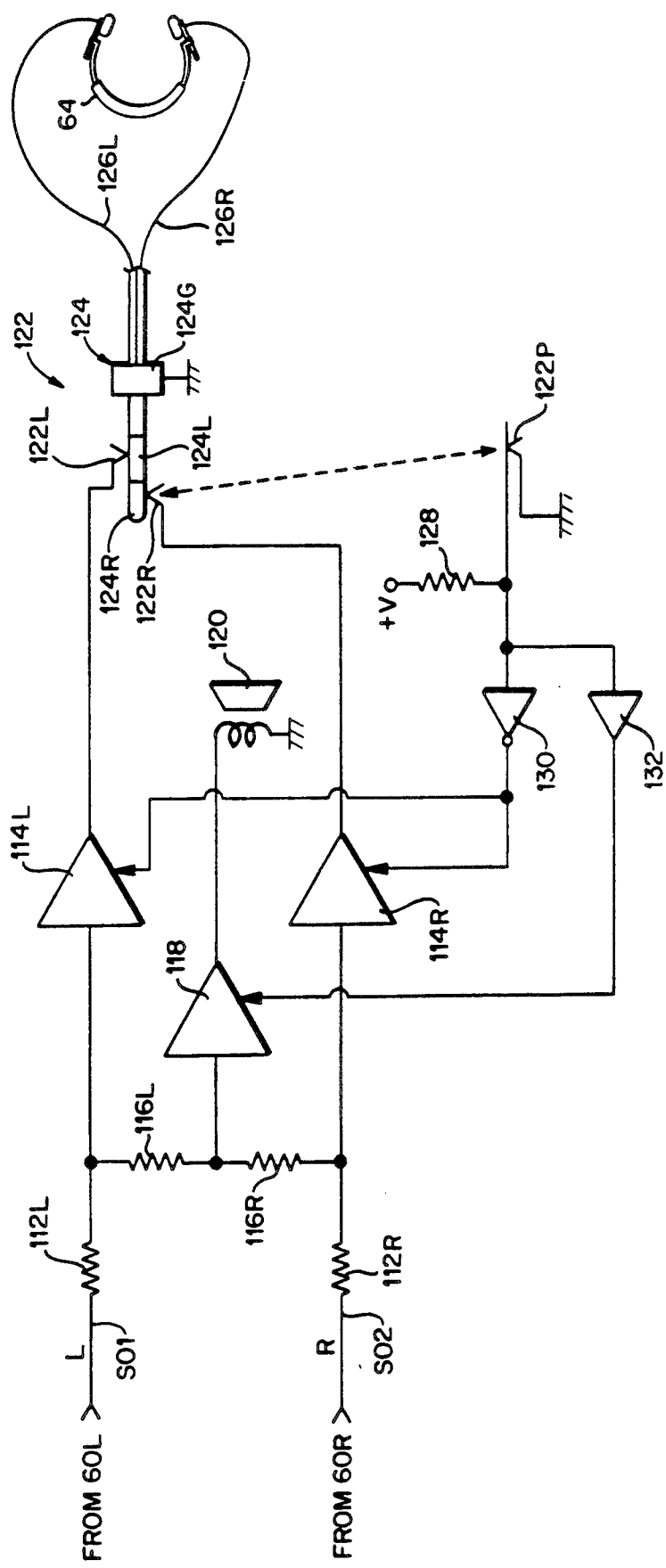
FIG. 8 STEREO/MONO SELECTING CIRCUIT

FIG. 9B

FREQUENCY DATA TABLE

| ADDRESS | DATA | CONTENTS |
|---|---|---|
| FREQD +0 | 00 | REST |
| +1 | 00 | |
| FREQD +2 | AB | C |
| +3 | 01 | |
| FREQD +4 | 01 | C #(SHARP) |
| +5 | 93 | |
| FREQD +6 | 01 | D |
| +7 | 7C | |
| FREQD +8 | 01 | D #(SHARP) |
| +9 | 67 | |
| FREQD+A | 01 | E |
| +B | 52 | |
| ⋮ | ⋮ | ⋮ |

ADDRESS FREQD → (points to FREQD+0)

312 (points to FREQD+A row)

FIG. 9C

DURATION DATA TABLE

| ADDRESS | DATA | LENGTH |
|---|---|---|
| ONPU +0 | 06 | SIXTEENTH |
| +1 | 0C | EIGHTH |
| +2 | 18 | QUARTER |
| +3 | 30 | HALF |
| +4 | 60 | WHOLE |
| +5 | 24 | DOTTED QUARTER |
| +6 | 48 | DOTTED HALF |
| ⋮ | ⋮ | ⋮ |

ADDRESS ONPU → (points to ONPU+0)

314

FIG.9D  MUSICAL SCORE DATA TABLE

TYPE OF DATA: D=Duration, F=Frequency(pitch), O=Output(left, right, or both)

| ADDRESS | NUMBER OF NOTE | TYPE OF DATA |
|---|---|---|
| +0<br>+1<br>+2 | 02<br>00<br>01 | D QUARTER NOTE<br>F REST<br>O LEFT |
| +3<br>+4<br>+5 | 02<br>0A<br>01 | D QUARTER NOTE<br>F MUSICAL INTERVAL (E)<br>O LEFT |
| +6<br>+7<br>+8 | 02<br>00<br>01 | D QUARTER NOTE<br>F REST<br>O LEFT |
| +9<br>+A<br>+B | 02<br>0A<br>01 | D QUARTER NOTE<br>F MUSICAL INTERVAL (E)<br>O LEFT |
| +C<br>+D<br>+E | 02<br>00<br>11 | D QUARTER NOTE<br>F REST<br>O LEFT AND RIGHT |
| +F<br>+10<br>+11 | 02<br>0A<br>11 | D QUARTER NOTE<br>F MUSICAL INTERVAL (E)<br>O LEFT AND RIGHT |
| +12<br>+13<br>+14 | 02<br>00<br>11 | D QUARTER NOTE<br>F REST<br>O LEFT AND RIGHT |
| +15<br>+16<br>+17 | 02<br>0A<br>11 | D QUARTER NOTE<br>F MUSICAL INTERVAL (E)<br>O LEFT AND RIGHT |
| +18<br>+19<br>+1A | 02<br>00<br>10 | D QUARTER NOTE<br>F REST<br>O RIGHT |
| +1B<br>+1C<br>+1D | 02<br>0A<br>10 | D QUARTER NOTE<br>F MUSICAL INTERVAL (E)<br>O RIGHT |
| ⋮ | ⋮ | ⋮ |
| +N | FF | D END OF TABLE |

ADDRESS BASE → (+0)

316

ELECTRONIC GAMING DEVICE WITH PSEUDO-STEREOPHONIC SOUND GENERATING CAPABILITIES

CROSS-REFERENCES TO RELATED APPLICATIONS

The subject application is related to the following copending commonly-assigned U.S. Pat. applications filed concurrently herewith:

U.S. Ser. No. 07/462,397 entitled "SYSTEM FOR PREVENTING THE USE OF AN UNAUTHORIZED EXTERNAL MEMORY" (attorney docket no. 723-42);

U.S. Ser. No. 07/462,400 entitled "COMPACT HAND-HELD VIDEO GAME SYSTEM" (attorney docket no. 723-43); and

FIELD OF THE INVENTION

The present invention relates to electronic gaming devices, and more particularly to microprocessor controlled electronic gaming devices providing a two-dimensional display. More particularly, the present invention relates to generation of pseudo-stereophonic music and sound effects in such an electronic gaming device. Still more specifically, the present invention relates to a pseudo-stereophonic sound generating apparatus and method for generating music, sound effects and other sounds in a gaming device (such as, for example, an electronic television gaming device or portable hand-held electronic liquid crystal display type gaming device) using an external memory cartridge.

BACKGROUND AND SUMMARY OF THE INVENTION

Conventional electronic video and other gaming devices generate sounds such as music, sound effects noises and the like in response to sound-representing digital data stored in a memory device. However, in the past the sound signals so generated were monaural rather than stereophonic for a variety of reasons.

As is well known, "stereophonic" sound generally provides two independent (but related) audio channels (e.g., "left" channel and "right" channel). Each of the audio channels includes independent audio (and other) signal processing circuitry. The signals generated by the independent stereo audio channels are typically reproduced by spatially separated audio transducers (e.g., "left" and "right" loudspeakers or headset transducers).

In the sound recording industry, the different stereo channels are typically recorded and/or mixed independently such that the audio signals existing in the two channels upon playback are different but related. Due to the phase and other signal relationships between related sounds generated simultaneously (or nearly simultaneously) in the different channels, the listener perceives a two-dimensional spatial quality to the sound. Stereophonic sound thus provides a more enjoyable listening experience because the listener perceives he is immersed in an envelope of sound emanating from plural spatially-separated sources. This effect is especially enhanced when listening to the stereophonic sound through a stereophonic headset.

As is well known, it is possible using conventional computer techniques to synthesize stereophonic sound by providing left and right channel sound generators controlled by left sound data and right sound data, respectively, stored in a digital memory device. Unfortunately, twice as much memory is typically required for producing such stereophonic sound as compared to the case in which only monaural sound is being generated. Moreover, it is also necessary to provide separate sound synthesizing circuits ("sound sources") for the left channel and the right channel, increasing the complexity and cost of the resulting circuit configuration.

A pseudo-stereo sound generating apparatus is disclosed in laid-open Japanese Utility Model Application No. 66800/1983. This reference discloses receiving an AM broadcast signal with an AM broadcast receiver (tuner) and enhancing the received AM signal (which is monaural) to provide a pseudo-stereophonic sound effect. This document does not address the problem of providing stereophonic sound in a video gaming device having limited memory resources.

The present invention provides a pseudo-stereophonic sound generating apparatus and method which generates pseudo-stereo sound using inexpensive, relatively uncomplicated circuitry which actually reduces memory requirements.

The present invention also provides a novel memory cartridge which can be used in a video gaming device having pseudo-stereo sound generating circuitry.

The present invention further provides a novel hand-held video gaming apparatus including a pseudo-stereo sound generator.

A further important and advantageous feature provided by the present invention is a hand-held video gaming device in which sound effects can be generated stereophonically through a stereo headset.

In accordance with one aspect of the present invention, a plurality of independent sound synthesizer circuits are provided. Some of the sound synthesizer circuits may be used for generating left-channel output signals, others of the sound synthesizer circuits may be used for generating right-channel output signals, and still others of the sound synthesizer circuits may be used for generating audio signals for application to both the left and the right audio output channels. However, in the preferred embodiment of the present invention there is no permanent assignment of sound synthesizer circuits to audio output channels. Instead, audio switching circuits provided at the output of the sound synthesizer circuits selectively direct the various synthesizer circuit outputs to the left or right audio output channels as desired. The states of the analog switching circuits may be altered under program control to change the audio output channel the signal produced by a particular sound synthesizer circuit is directed to.

For example, in accordance with a feature provided by the present invention, a left channel audio signal bus and a right channel audio signal bus are provided. The left channel audio signal bus provides left channel audio signals to a left channel audio signal amplifier and associated sound transducer (e.g., the left channel transducer of a stereophonic headset). Similarly, the right channel audio signal bus applies a right channel audio signal to a right channel audio amplifier and associated sound transducer (e.g., a right channel transducer of the same stereophonic headset). A plurality of sound synthesizer circuits ("sound sources") are also provided. The sound sources in the preferred embodiment independently produce various audio signals (e.g., musical pitches, sound effects, etc.) under program control. The output of each (any) of the plurality of sound sources may be coupled to the left channel audio signal bus via left channel analog switches and/or to the right channel audio signal bus via right channel analog switches. The states of the analog switches are controlled by program control instructions and thus may be dynamically changed as desired.

Thus, the output of a particular sound source may be applied to only the left channel audio signal bus, to only the right channel audio signal bus, or to both the left and the right audio signal buses by simply selecting the states of the analog switches coupled to its output (and these states can be changed as desired under program control). By simultaneously or selectively turning on or off the left channel and right channel analog switches associated with a particular sound source, sound signals may be directed to one, the other or both audio output channels.

Since in accordance with the present invention it is possible to select the channel a particular sound source applies its output to, there is no requirement to store completely different sets of sound generating data (left channel and right channel) corresponding to the two sterephonic musical programs. That is, it is only necessary to store different sound generating data for controlling the plural sound generating sources which are to be active during a particular time. The additional data used for selecting which of the audio channels the various sound sources are to apply their outputs to requires very little additional storage space—allowing pseudo-stereophonic sound to be provided with only a slight addition in memory storage capacity. Since it is possible to select which channels a particular sound source signal is to be applied to, memory requirements do not increase substantially (in contrast with a situation in which left and right channel signals are stored separately in memory, which generally requires two times the amount of memory needed to store audio information for a monaural channel). Moreover, a more versatile and less complex circuit configuration is provided by the present invention, making it especially suited for generating sound effects within a miniaturized portable video gaming device.

In the video gaming device described above, a sound source signal generated by the sound source signal generating means is thus selectively outputted by the first and second (e.g., left and right) sound signal channels to a switching operation performed by the analog switching means so as to produce a pseudo-stereophonic sound.

The present invention also provides a memory cartridge detachably engageable to a video gaming device which provides stereophonic sound control signals. The video gaming device includes sound source signal generating means for generating a sound signal in accordance with data provided by the memory cartridge. Switching means may connect an output of the sound signal generating means to either or both of first and second sound output channels, and selectively applies the output of the sound source signal generating means to the first and/or the second sound signal output channels. For music generation, the memory cartridge preferably stores data representing the duration (length in time) of a musical note or rest; data associated with musical pitch; and "direction data" specifying the audio output channel to which the sound generated at the specified pitch and for the specified duration is to be directed.

The memory cartridge stores a sequence of such sets of data corresponding to a sequence of musical or sound effect events (i.e., notes and rests) and, in the preferred embodiment, accesses the data sets in the order of the sequence (with time separating the access of different data sets in the sequence) so as to specify the sequence of musical or sound effect events. In the preferred embodiment the memory cartridge may store plural data sets corresponding to a given instant in the sequence of musical or sound effect events—thus providing simultaneous control over multiple sound sources.

The memory cartridge in the preferred embodiment further stores program control instructions for reading respective data representing sounds for predetermined timings—thus providing a mechanism for applying the length (duration) associative data, musical pitch associative data and left/right channel specifier ("direction") data to the video gaming device in accordance with program control instructions read from the cartridge.

The memory cartridge of the preferred embodiment of the present invention preferably stores multiple data structures representing different aspects of the sound to be generated. In particular, the cartridge preferably stores a musical score data table representing information typically represented by sheet music (e.g., the pitch and duration of musical notes, and the duration of rests for a sequence of such notes and rests). This musical score data table in turn preferably provides offset addresses into a duration data structure mapping different musical note and rest durations stored in the musical score table into appropriate sound generator circuit timing control signals; and into a frequency data structure mapping different pitches into appropriate sound generator circuit pitch control signals.

In accordance with the progress of the computer program stored within the memory cartridge, the duration associative data, musical pitch interval associative data and left/right channel direction specifying data are read from the musical score table at predetermined timings (these timings are otherwise determined by program flow). Musical pitch of generated sounds is determined in accordance with musical pitch associative data and a sustained time period (i.e., length or duration) of that musical pitch is determined in accordance with the length (duration) associative data. The output multiplexing (switching) operation as described above is performed in accordance with the left/right channel direction specifying data to obtain right channel sound output or left channel sound output as desired. Thus, the sequence of musical notes stored in the musical score table can be generated in pseudo-stereophonic sound. Since the left or right channel data is stored in the memory cartridge and the left/right channel selection data specifies which channel the audio represented by any specific pitch and duration data is to be directed to, it becomes possible to easily generate or produce pseudo-stereo sound such as music or sound effects.

In accordance with a further feature of the present invention, a stereo/monaural changing circuit is connected to a stereo sound source from which left and right sound signals are independently outputted. The stereo/monaural changing circuit preferably includes an earphone jack for receiving a conventional stereo type audio plug. The earphone jack includes at least one switching contact as well as left and right channel audio contacts. The left channel audio contact conducts left channel audio signals to the headset left channel audio transducer, and the right channel audio contact similarly conducts right channel audio signals to the headset right channel audio transducer. In addition, a monaural audio transducer (e.g., a loudspeaker internal to the video gaming device) may be provided.

When no earphone plug is inserted into the earphone jack, the switching contact generates a control signal which automatically deactivates the independent left and right channel audio signal paths connected to the earphone jack left and right channel outputs, and automatically activates a combining ("mixing") circuit which combines the left and right channel audio signals together into a monaural signal. The combining circuit applies the combined audio monaural signal to the video gaming device internal loudspeaker. On the other hand, inserting an earphone plug into the earphone jack changes the state of the control signal produced by the earphone jack switching contact to deactivate the combining circuit (and thereby automatically deactivate the internal loudspeaker) and to instead complete the independent left and right signal channel paths to the earphone jack left and right channel contacts.

Thus, when the earphone plug is not inserted into the earphone jack, a monaural synthesized sound signal is provided to the internal speaker. When the earphone plug is inserted into the earphone jack, on the other hand, the left channel and right channel signal paths are not disabled and are instead respectively outputted to the left channel and right channel contacts of the earphone jack—and stereophonic sound is thus outputted to the stereophonic headset plugged into the earphone jack. In this way, the user may easily play the video gaming device as a completely self-contained unit and listen to monaural sound generated by an internal loudspeaker. If on the other hand, the player would like to experience the sound enhancement provided by the pseudo-stereo sound generating capabilities described above, he need only insert the plug of stereo headset into the earphone jack and place the headset on his head.

Thus, this feature of the present invention provides a novel stereo/monaural changing circuit capable of selecting between stereophonic sound and monaural sound even though the sound generating data stored in the data cartridge controls the sound generating circuitry to generate pseudo-stereophonic sound. Such a stereophonic/monaural selecting circuit is very effective for generating sound effects in a hand-held video type gaming machine.

BRIEF DESCRIPTION OF THE DRAWINGS

These and other objects, features, aspects and advantages of the present invention will become more apparent and better understood from the following detailed description of the presently preferred exemplary embodiment of the present invention taken in conjunction with the appended sheets of drawings, of which:

FIGS. 3A-3D are schematic diagrams of an exemplary map of the address space of the CPU shown in FIG. 2;

FIG. 4 is a schematic block diagram of an exemplary sound generator shown in FIG. 2;

FIG. 4A is a schematic diagram of exemplary contents of the registers NR50, NR51 and NR52 shown in FIG. 4;

FIG. 5 is a more detailed circuit diagram of an exemplary one of the sound generating circuits shown in FIG. 4;

FIGS. 5A-5D are schematic diagrams of exemplary contents of the sound control registers within the sound generating circuits shown in FIGURE 4;

FIG. 6 is a graphical illustration of exemplary sheet music also showing some of the control parameters used for controlling the different sound generating circuits shown in FIG. 4;

FIG. 8 is a schematic circuit diagram of an exemplary stereophonic/monaural selecting circuit arrangement shown in FIG. 4; and FIGS. 9A-9D are schematic diagrams of exemplary contents of the memory cartridge shown in FIGS. 1 and 2.

DETAILED DESCRIPTION OF PRESENTLY PREFERRED EXEMPLARY EMBODIMENTS

First described will be the overall electronic gaming system provided by the presently preferred exemplary embodiment of the present invention. Following will be presented a more detailed description of the microcomputer arrangement of the preferred embodiment, including the exemplary structure of the microcomputer and an exemplary memory organization for the microcomputer. Then, a detailed description of the sound generator of the preferred embodiment will be presented. In connection with the sound generator, first described will be the overall architecture and operation of the preferred embodiment sound generator, including the manner in which plural independent sound generating circuits are preferably used in cooperation with one another to provide pseudo-sterephonic sound. Next presented will be a detailed description of the structure and operation of an exemplary one of the plural independent sound generating circuits. Following will be presented a description of exemplary program control steps which may be performed and associated exemplary data structures which may be accessed by the microcomputer of the preferred embodiment to generate a line of music. Finally, a description of an exemplary stereophonic/monaural sound changing circuit will be presented.

Figure 1:
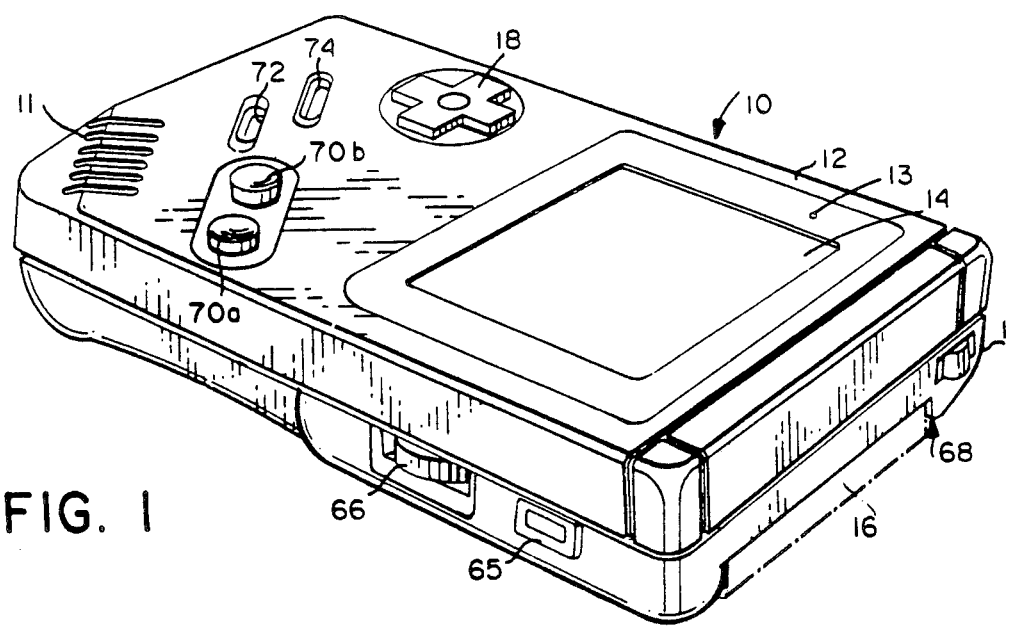
FIG. 1 is a side perspective view of an exemplary hand-held liquid crystal display type video gaming device with which the present invention may be advantageously utilized.

Overall Structure and Operation of the Presently Preferred Exemplary Gaming Device FIG. 1 is an elevated perspective view showing the exterior housing of an exemplary hand-held liquid crystal electronic game machine in accordance with an exemplary presently preferred embodiment of the present invention. This hand-held liquid crystal game machine (hereinafter referred to as "game machine") 10 includes a case 12 which is provided with an LCD panel 14 including dot display segments being arranged in accordance with a dot-matrix system on a front or upper surface thereof.

On a rear or lower surface of the case 12, an insertion port 68 is formed at a portion opposite to the LCD panel 14. An external ROM memory cartridge 16 is pluggably inserted in the insertion port 68. More specifically, a 32-pin connector 20 is provided within the insertion port 68. By inserting the external ROM cartridge 16 into the insertion port 68, a connector (not shown) formed at an edge of a printed circuit board of the external ROM cartridge 16 is electrically and mechanically connected to the connector 20. Thus, the external ROM cartridge 16 can be attachably/detachably connected to the game machine 10.

As referred to herein, the external ROM cartridge 16 is a "memory cartridge" and the game unit 10 into which the memory cartridge is inserted is the "main unit." The cartridge 16 and main unit 10 in combination comprise an electronic gaming device. Different memory cartridges 16 may be inserted into port 68 so as to provide different program control instructions—and thus to change the game being played.

An external ROM 16a (see FIG. 9A) is incorporated in the external ROM cartridge 16. A game program is stored in the external ROM 16a within program control instructions area 310. In addition, cartridge may also include additional memory devices (e.g., expansion RAM, a memory bank controller (MBC), etc.) as is well known. When the external ROM cartridge 16 is inserted into the game machine 10, the game program is executed such that an image is displayed on the LCD panel 14 and music for the game is generated at speaker 11 or through ear phones connected at jack 64.

A six-pin connector 65 is also provided in the case 12, whereby the game machine can be linked to other machines by an appropriate cable so that multiple player competition is possible when the external cartridges include multiple-player game programs.

A user input means comprising cross-key switch 18 in the preferred embodiment is provided on the front or upper surface of the case 12 at a left side portion below the LCD panel 14, as shown in FIG. 1. The cross-key switch 18 has four direction designating portions or contacts and, by depressing any one of the same, it is possible to, for example, move a game character displayed on display 14 upward or downward or leftward or rightward. In addition, as shown in FIG. 1, two push-button switches 70a and 70b are provided on the front or upper surface of the case 12 at a right side portion below the LCD panel 14. These push-button switches 70a and 70b are operated when it is necessary to control the game character being displayed on the LCD panel 14 to perform various predetermined actions. For example, when the push-button switch 70a is depressed, the displayed character may appear to jump, or when the push-button switch 70b is depressed, the character may appear to throw a stone, or a ball, or launch various other objects. Thus, the cross-key switch 18 is disposed to be operated by the thumb of the left hand, which sandwiches the case 12 in cooperation with the right hand, and the push-button switches 70a and 70b are disposed to be operated by the thumb of the right hand.

Furthermore, a start switch 72 and a select switch 74 are provided on the front or upper surface of the case 12 of the game machine 10. As seen from FIG. 3, the start switch 72 and the select switch 74 are arranged in a region 78 below the cross-key switch 18 and the push-button switches 70a and 70b. These switches 72 and 74 are centrally disposed so as to be operated by the thumbs of any one of the left hand and the right hand (while the left hand and the right hand hold the case 12 of the game machine 10). In other words, the switches 72 and 74 may be operated without significantly changing the positioning of the hands. The select switch 74 is used, for example, to select the mode of operation of the game being displayed through the use of a menu screen. In this regard, the select switch 74 may be used to select one of a number of levels of game play. In addition, a function for selecting a "weapon" usable by a game character can be assigned to the select switch 74.

The start switch 72 is operated to start the game as selected. Therefore, it is not typically necessary to operate the start switch 72 and the select switch 74 during the game. However, since a pause (PAUSE) function is also assigned to the start switch 72, the start switch 72 may be depressed when it is desired for the game to be temporarily stopped. To start the game after such a pause, the start switch 72 may be depressed again. Furthermore, it is possible to make the start switch 72 and the select switch 74 possess many other functions under program control and to dynamically change the functions assigned to the switches as game play progresses.

The case 12 is additionally provided with on/off switch 1, battery power level light 13, contrast adjustment 50, and volume adjustment 66.

Exemplary Microcomputer Arrangement

Figure 2:
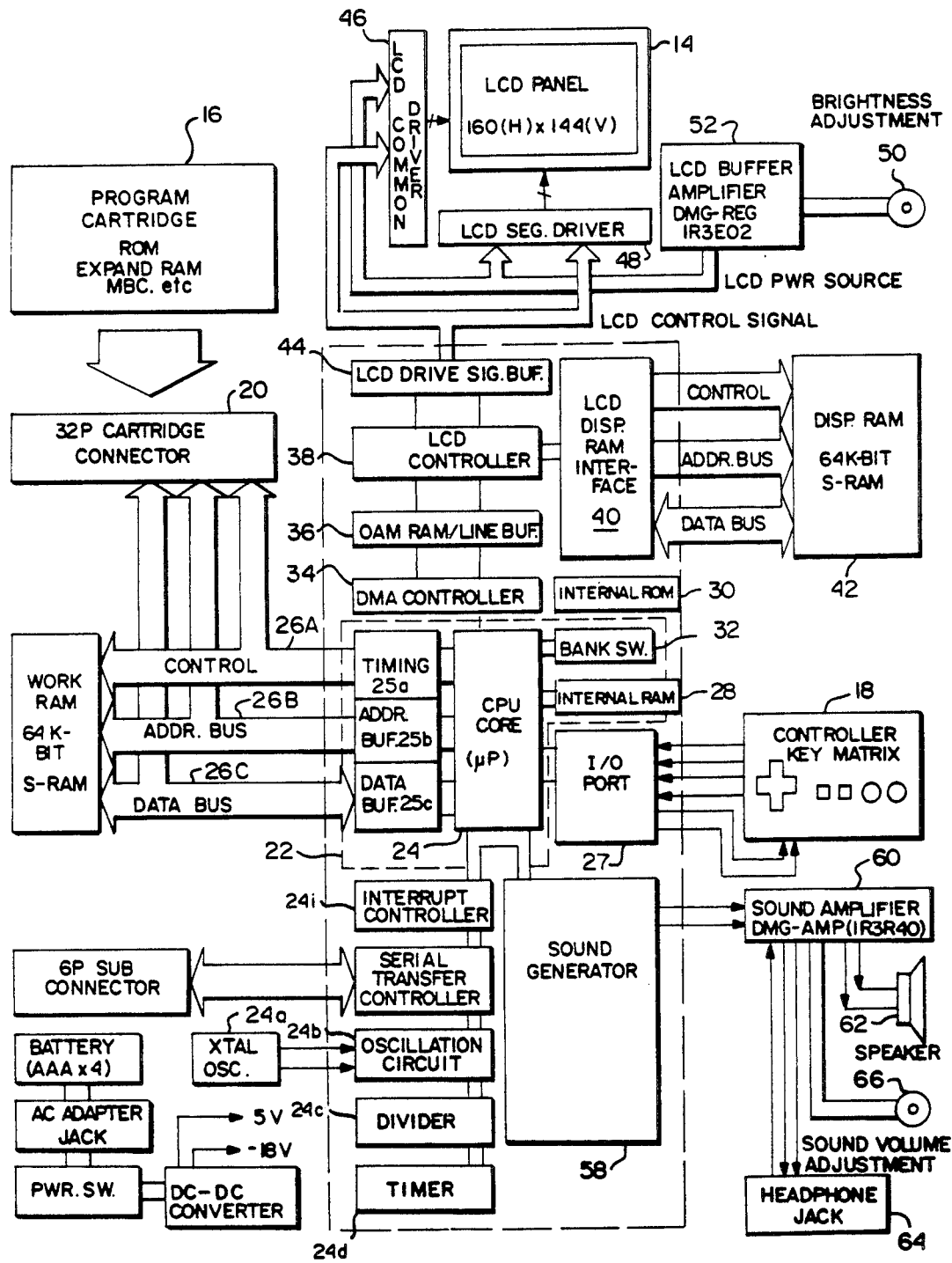
FIG. 2 is a schematic block diagram of the electronic circuitry contained within the FIG. 1 gaming device.

The heart of gaming device 10 is microcomputer 22 shown in FIG. 2 (a detailed schematic diagram of the electronic circuitry within the gaming device). Microcomputer 10 includes a CPU 24, which may, by way of example only, be implemented with a commercially available microprocessor such as a Z80 type VLSI integrated circuit microprocessor chip. The CPU 24 is connected to the 32-pin cartridge connector 20 (and thus to the memory and other components within cartridge 16) via timing unit 25a and control bus 26a, address buffer 25b and address bus 26b and data buffer 25c and data bus 26c (which buses and associated components also connect the CPU to a work RAM or scratch-pad memory 23). When the external ROM cartridge 16 is engaged with the game machine 10, the CPU 24 is coupled to and cooperates with the external ROM cartridge 16.

Figure 2A:
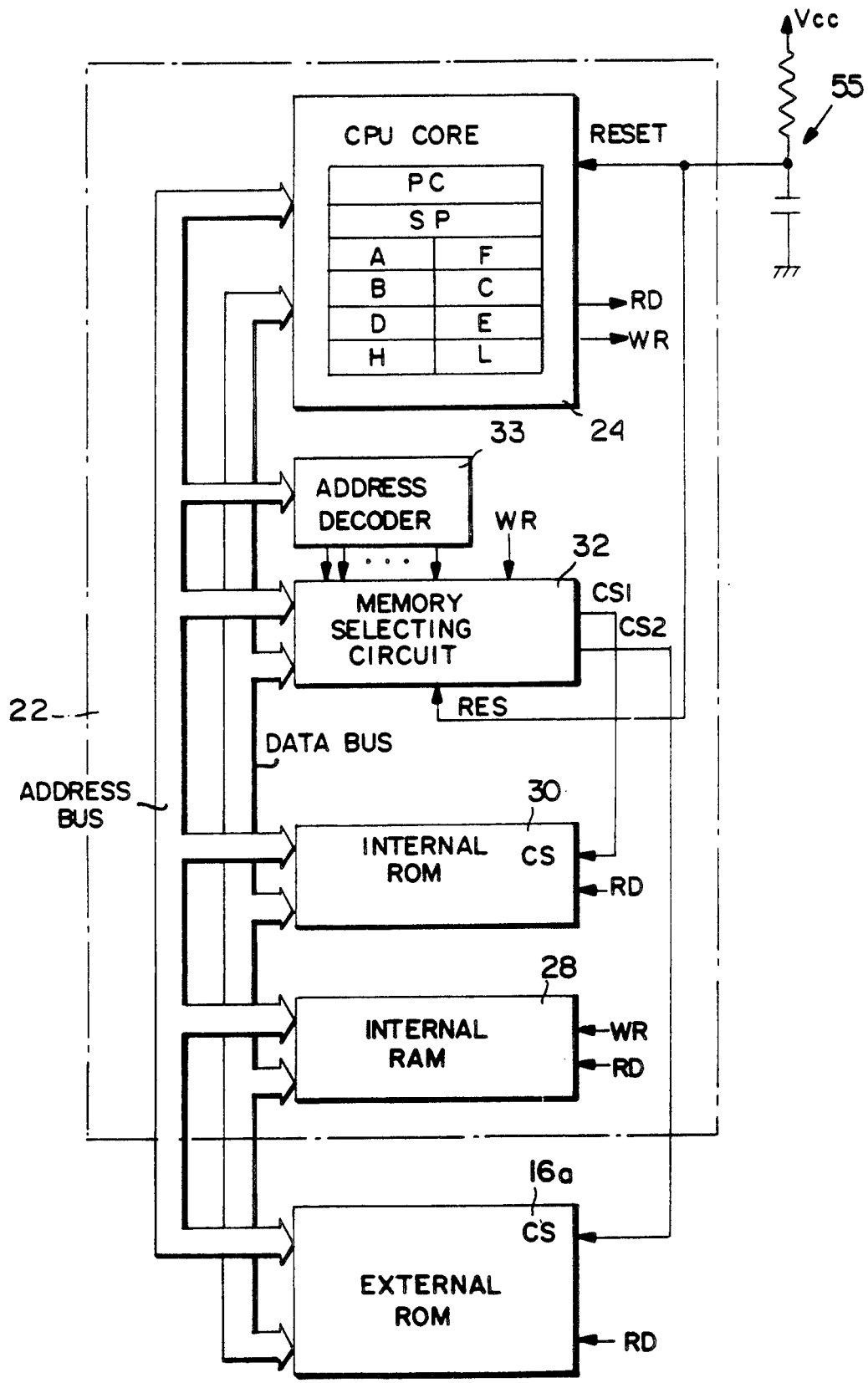
FIG. 2A is a more detailed schematic diagram of the architecture of the microcomputer shown in FIG. 2.

Referring now more particularly to FIG. 2A, CPU 24 cooperates with an address decoder 33 and memory selecting (bank switch) circuit 32 in the preferred embodiment to address the various devices within the address space of the CPU (e.g., an internal ROM 30, an internal RAM 28, and an external ROM 16a within cartridge 16). In addition, address decoder 33 may be used to permit CPU 24 to address various external control registers contained within other blocks shown in FIG. 2 (e.g., control registers within sound generator 58) or other similar address decoders may perform this function.

As is shown in FIG. 2A, CPU 24 preferably includes internal 8-bit general purpose and special purpose registers, a 16-bit program counter PC and a 16-bit stack pointer SP. A register A may be used as an accumulator and another register F may be used as a flag register. The CPU 24 preferably has an associated instruction set permitting a variety of 8 and 16 bit transfers between registers or register pairs, a variety of 8 and/or 16 bit arithmetic operations (e.g., ADD, SUB, AND/OR, INC. DEC, etc.), a variety of rotate/shift operations (e.g., rotate specified register contents left/right), a variety of bit control operations (e.g., setting a specified bit in a specified register), conditional and unconditional branch operations, subroutine call and return operations and a variety of program control operations (e.g., start, stop, no operation, etc.)—all as is well known to those skilled in this art.

CPU 24 in the preferred embodiment performs such operations under control of program control instructions stored in memory cartridge 16 to provide game play display on display 14 in response to user inputs provided by the user via user input means 18. In addition, CPU controls sound generator 58 to generate music and/or sound effects corresponding to gameplay under control of said same program control instructions stored in cartridge 16.

Referring once again to FIG. 2, clock pulses are supplied to CPU 24 by oscillator circuit 24b in response to quartz crystal element 24a. Clock pulse divider 24c provides one or more clocking pulse rates and may be programmable by CPU 24 to divide the clock pulses provided by oscillator circuit 24b by a desired ratio.

A programmable external hardware timer circuit 24d may also be provided to allow CPU to determine when preset desired time intervals have elapsed. In the preferred embodiment, CPU 24 may load timer circuit 24d with a value representing the duration of a time interval and then start the timer. The timer circuit 24d may automatically time the interval and when that interval elapses, the timer circuit may generate a interrupt signal which it applies to the CPU 24 (e.g., via interrput controller 24i) to alert the CPU that the time interval has elapsed. In this way, CPU 24 has the capability of timing intervals without having to use software timing loops (which may occupy CPU processing time and resources). This timer circuit 24d may be used if desired to time the duration of musical notes generated by sound generator 58 (as will be explained shortly).

CPU 24 outputs display data to an LCD controller 38 via a line buffer 36 under the control of a DMA controller 34 in the preferred embodiment. The LCD controller 38 is connected to a display RAM 42 via an LCD display RAM interface 40 and control, address and data busses.

The LCD controller 38 operates under the control of CPU 24 via various addressable control/status registers which are located in the CPU address space as shown generally in FIGS. 3A-3D. These registers may include, for example, the following: LCD display register, LCD controller status register, horizontal and vertical scroll registers, LCDC vertical line identification register, and moving object and background palette (e.g., 2 bits identifying 1 of 4 gradations of shaded color) data register. The LCD display register controls the nature of the display, and the status register indicates the current status of the LCD controller. Data corresponding to each dot of the background display data can be made available by changing the data of the horizontal vertical scroll registers. The vertical line identification register indicates and controls the vertical line of the display to which data is presently being transferred by way of the display drivers. The X and Y window position registers control that portion or window of the LCD display area in which the OBJ (motion picture) character as well as the BG (background) character data appears.

The LCD controller 38 converts display related data output from the CPU 24 into an LCD drive signal which is output from the display RAM 42. More specifically, the display data from the CPU 24 designates addresses of the character RAM and the VRAM (video RAM) such that a character (or object) signal and a background signal are output from the character RAM and the VRAM. Respective LCD drive signals are composed by the LCD controller 38.

The LCD drive signals are applied to an LCD common driver 46 and an LCD segment driver 48 through an LCD drive signal buffer 44. Therefore, by means of the LCD common driver 46 and the LCD segment driver 48, an image in accordance with the display related data from the CPU 24 can be displayed on the LCD panel 14. The LCD panel may, for example, define a 144 × 160 matrix of pixels or dots, each having a corresponding unique "intersecting" common electrode/segment electrode combination. The LCD common driver 46, which drives the lines connected to the common electrodes, may for example, be a Sharp Corporation type LH 5076 F integrated circuit. The LCD segment driver 48, may for example be a Sharp Corporation type LH 5077 F integrated circuit. These display drivers receive data from the LCD drive signal buffer 44, which receives data indirectly from the CPU 24 via the display RAM 42, the LCD RAM interface 40 and the LCD controller 38.

In addition, an intensity level control 50 is connected to an LCD buffer amplifier 52 such that the intensity of the display generated by LCD panel 14 can be adjusted.

Referring once again to FIG. 2A, a reset signal from a reset circuit 55 is applied to the CPU 24 and the memory selecting circuit 32. The reset signal is output when a power switch 1 (see FIG. 1) of the game machine 10 is turned on, and therefore, the CPU 24 and the memory selecting circuit 32 are initially reset at that time. Then, a read signal RD and write signal WR are output from the CPU 24, which are suitably input to the external ROM cartridge 16, internal RAM 28, internal ROM 30 and the memory selecting circuit 32. In addition, an address decode signal is applied to the memory selecting circuit 32 via an address decoder 33.

Exemplary Microcomputer Memory Organization

Now, with reference to FIG. 3A-3B, an exemplary CPU address space and the nature of the data stored in internal memory 30 and the external memory cartridge 16 will be described in detail. As shown in FIGS. 3A and 3B, the internal ROM 30 has a first memory area which is designated by the addresses "0000H-00FFH" which corresponds to a first relatively small address space. The "H" indicates that these addresses are represented as a hexadecimal number. In the first memory area, first character data for displaying, for example, a trademark "Nintendo", and an external memory authenticity determining program are stored.

The external ROM cartridge 16 includes the external ROM 16a. As shown in FIGS. 3C and 3D, the memory space of the external ROM 16a is divided into a second memory area which is designated by the addresses "0000H-00FFH" (which correspond identically to the addresses defining the above-described first address space) and a third memory area (second address space) which is designated by the addresses "0100H-7FFFH". In an authorized external memory cartridge, in a region starting at the address "0100H" in the third memory area, second character data (which is the same as the first character data) is stored. A game program is stored in the remaining region of the third memory area. Preferably, in a few bytes after the second character data storing region, auxiliary data such as a code identifying a manufacturer, the name of the game, the cartridge type, the memory size, etc., are stored. In addition, in the case where the required capacity of a game program is large, the second memory area ("0000H-00FFH") of the external ROM 16a may be used to store such a program data for the game.

Sound generator 58 shown in FIG. 2 is also controlled by CPU 24 in accordance with program control instructions stored in cartridge 16. In the preferred embodiment, sound generator 58 includes a plurality of independent sound generating circuits which CPU can control independently or in combination to produce multiple sounds simultaneously. These registers reside the the "various registers" portion of the memory space shown in FIG. 3B between locations FF00 (Hex) and FF80 (Hex). CPU 24 controls sound generator 58 by writing appropriate control data to 8-bit registers physically located within the sound generator but directly addressable by the CPU and located within the CPU address space.

In the preferred embodiment, this sound generator register interface occupies the addresses FF10-FF26 within the CPU address space as follows:

Registers NR10-NR15 (controlling a first sound generating circuit) are located at addresses FF10-FF14;

Registers NR21-NR24 (controlling a second sound generating circuit) are located at addresses FF16-FF19;

Registers NR30-NR34 (controlling a third sound generating circuit) are located at addresses FF1A-FF1E;

Registers NR41-NR44 (controlling a fourth sound generating circuit) are located at addresses FF20-FF23; and Registers NR50-NR52 (which provide overall sound control over the outputs of each of the sound generating circuits) are located at addresses FF24-FF26.

Some of the registers mentioned above are write only while other registers are read/write. CPU 24 can control various parameters of sound generation (e.g., frequency sweep parameters for certain sound generating circuits, waveform duty cycle, sound duration, envelope characteristics, sound frequency, polynomial counter parameters for certain sound generating circuits, the allocation of certain sounds to certain output channels, and sound output levels) directly by writing control data into the appropriate sound control registers (as will be described shortly).

Exemplary Sound Generator

FIG. 4 is a more detailed schematic diagram of sound generator block 58 shown in FIG. 2. Sound generator block 58 in the preferred embodiment includes a plurality of sound generator circuits 541-544, an analog multiplexer block 200, left and right solid state volume control blocks 72L,72R, left and right channel audio amplifiers 60L,60R, and a stereo/mono selection circuit 202.

Sound generator circuits 541-544 each independently generate audio signals in the preferred embodiment under control of the contents of control registers NR10-NR44 within the address space of CPU 24 as described above. The analog multiplexer 200 is controlled by registers NR50-NR52 within the address space of CPU 24 to route each of the sound generator circuit 541-544 outputs to either or both of the left channel volume control 72L and the right channel volume control 72R. As will be explained in greater detail shortly, the analog multiplexer 200 provides independent multiplexing control for each sound generator circuits 541-544 output under program control. As one example, one sound generator circuit output may be routed to the left channel volume control 72L, another sound generator circuit output may be routed to the right channel volume control 72R, yet another sound generator circuit output might be routed to both left and right channel volume controls, and still another sound generator circuit output might be routed to neither of the volume controls (all of these assignments can change under program control).

The outputs of volume controls 72L,72R are amplified by left channel audio amplifier 60L and right audio amplifier 60R, respectively. The outputs of audio amplifiers 60 in turn are applied to the stereo/mono selection circuit 202 for application to an internal mono loudspeaker 120 or to an optional external stereo headset 64 via an earphone jack 122.

Analog multiplexer 200 receives the respective outputs of sound generating circuits 541-544 (that is, the sound source signals). Analog multiplexer 200 includes a pair of analog switches for each of sound generating circuits 541-544. For example, analog switches 681L, 681R correspond to sound generating circuit 541; analog switches 682L, 682R correspond to sound generating circuit 542; analog switches 683L, 683R correspond to sound generating circuit 543; and analog switches 684L, 684R correspond to sound generating circuit 544. The outputs of one of the analog switches in each pair of analog switches (e.g., analog switches 681L, 682L, 683L, 684L) are commonly connected to the left audio bus 300. The left audio bus 300 in turn is connected to the input of volume control block 72L. Similarly, the output of the other analog switch in each pair of the analog switches (analog switches 681R, 682R, 683R and 684R) is connected to a right audio bus 302 (i.e., so that all of these mentioned analog switches have their outputs connected in common). The right audio bus 302 is, in turn, connected to the output of the right channel volume control block 72R. The respective outputs of solid-state volume control blocks 72L, 72R (that is, the two sound signals) are respectively amplified by left and right channel amplifiers 60L and 60R and thereafter outputted as first and second sound outputs S01, S02. In the embodiment shown, the output S01 from amplifier 60L may be utilized as a left channel sound signal, while the output S02 from amplifier 60R may be utilized as a right channel sound signal FIG. 4A is a schematic block diagram depicting exemplary registers NR50, NR51 and NR52 shown in FIG. 4. Registers NR50-NR52 are used in the preferred embodiment to control some of the operating parameters of sound generating circuits 541-544, analog multiplexer 200, and volume controls 72L, 72R. Although multiple registers NR50A-NR50C are depicted in FIG. 4, NR50A-NR50C actually may comprise a single multi-bit (e.g., eight bit) register as shown in FIG. 4A, and similarly multiple registers NR52A-NR52B shown in FIG. 4 may actually comprise a single multi-bit register NR52 as shown in FIG. 4A.

Registers NR52A-NR52B (which in the preferred embodiment comprises a single 8-bit register operatively coupled to CPU 24) is used to control the enablement/disablement of sound generating circuits 541-544. As shown in FIG. 4A, a most significant bit D7 of register NR52 may be used to enable/disable all of sound generating circuits 541-544. If the most significant bit D7 of register NR52 is set to logic level one, all of the sound generating circuits 541-544 become operable; and similarly, if a logic level "zero" value is written to register NR52 most significant bit D7, all of the sound generating circuits 541-544 are disabled. The least significant four bits D0-D3 of register NR52 are utilized as sound generating circuit ON flags for the individual sound generating circuits 541-544, and permit the sound generating circuits to be individually enabled or disabled depending upon the logic level value written into these four bits D0-D3.

The states of analog switches 681L-684L, 681R-684R are controlled in the preferred embodiment by a register NR51 a detailed schematic diagram of which is also shown in FIG. 4A. Register NR51 is also 8-bits wide in the preferred embodiment. Least significant four bits D0-D3 of register NR51 respectively correspond to analog switches 681L-684L and control those analog switches to turn ON and OFF (i.e., to pass or not pass) the outputs of respectively corresponding sound generating circuits 541-544 to the left audio bus 300. Similarly, the most significant four bits D4-D7 of register NR51 control analog switches 681R-684R, respectively to turn ON and OFF (so as to controllably pass or not pass the outputs of sound generating circuits 541-544, respectively to the right audio bus 302).

Suppose, for example, that logic level zero values are written into register NR51 bits DO and D4 (which correspond to, for example, analog switches 681L and 681R, respectively). The logic level zero value stored in least significant bit D0 controls analog switch 681L to turn OFF—thereby effectively disconnecting the output of sound generating circuit 541 from the input of left channel solid-state volume control block 72L. Likewise, the logic level zero stored in register NR51 bit D4 controls analog switch 681R to effectively disconnect the output of sound generating circuit 541 from the input of right channel solid-state volume control block 72R. Hence, whenever these two "zero" bit values are stored in register NR51, the output of sound generating circuit 541 is passed on to neither the left channel output S01 nor the right channel S02. Writing a logic level one to register NR51 bit D0 controls analog switch 681L to pass the output of sound generating circuit 541 to left channel output S01; writing a logic level one value to bit D4 of register NR51 controls analog switch 681R to pass the output of sound generating circuit 541 to right channel output S02; and writing logic level one values to both bits D0 and D4 controls analog switches 681L and 681R to pass the output of sound generating circuit 541 to (both) the left and right sound signal outputs S01, S02, respectively.

In summary, register NR51 in the preferred embodiment stores two bits corresponding to each of sound generating circuits 541-544, these two bits controlling the analog switches 681 connected to the sound generating circuits to selectively pass or not pass the output of the sound generating circuits to outputs S01, S02. If these two bits are both at logic level zero, the sound generating circuit output is not passed to either of the sound outputs S01, S02. If one of the bits is logic level one and the other bit is at logic level zero, the sound generating circuit output is passed to only one of the sound generating outputs S01,S02 (which of the sound signal outputs S01,S02 receives the output of the sound generating circuit depends upon which of the bits is at logic level one). If both of the bits are set to logic level one, on the other hand, both of the sound signal outputs S01,S02 receive the output from the corresponding sound generating circuit.

Registers NR50A-NR50C shown in FIG. 4 actually comprise a single 8-bit register NR50 in the preferred embodiment (as is shown in FIG. 4A). Two of the bits D3,D7 of register NR50 are used to turn ON and OFF a further set of analog switches 70L,70R the inputs of which are connected to a signal VIN obtained from an external sound source. For example, an additional sound source signal may be provided in the preferred embodiment from a sound generating source other than sound generating circuits 541-544. This externally-provided sound source signal is inputted as signal VIN which is selectively passed or not passed to left audio bus 300 and right audio bus 302 by analog switches 70L,70R respectively. Analog switches 70L,70R in turn have their ON/OFF states selected by register NR50 bits D3,D7, respectively.

The remaining six bits of register NR50 in the preferred embodiment are used to control the degree of amplification/attenuation applied by solid-state volume controls 72L,72R. Thus, in the exemplary embodiment register NR50B shown in FIG. 4 comprises the least significant bits D0-D2 of register NR50, while register NR50C shown in FIG. 4 comprises bits D4-D6 of register NR50 shown in FIG. 4A. By setting binary values "000"-"111" into these 3-bit fields, it is possible to control the output levels of solid-state volume control blocks 72L,72R from a minimum to a maximum level in eight steps. Thus, for example, writing a value "000" to register NR50 least significant bits D0-D2 in the preferred embodiment controls solid-state control block 72L to provide a minimum amplitude level (which may be zero amplitude if desired) to the input of left channel amplifier 60L. Similarly, writing a value "111" to register NR50 bits D4-D6 controls right channel volume solid-state volume control 72R to provide the minimum degree of amplification to the signal provided to it from right channel audio bus 302, thus providing the maximum (loudest) signal level output at right channel sound signal output S02.

Referring now to FIGS. 4 and 6 together, sound generating circuit 541 may be used (as one example) as a melody source ("sound 1")—to provide the top stanza or line of exemplary musical composition shown in FIG. 6. The remaining sound generating circuits 542-544 may be used to produce rhythm sounds as shown in the lower three stanzas of music set forth in FIG. 6. Of course, it is possible to use sound generating circuits 541-544 in any combinations desired to produce multiple melodies (i.e., counterpoint), melody and harmony together, combinations of music and sound effects, etc.

In the musical notation shown in FIG. 6, the lines of music labeled S01 correspond to sounds apparent in the left channel, and the lines labeled S02 correspond to sounds appearing on the right audio channel. FIG. 6 shows standard musical notation with musical notes and rests depicted in a conventional manner. Four measures of music are shown for purposes of example (although it will be understood that the system described herein is capable of playing musical compositions of any desired length limited only by memory capacity).

As to the four bars or measures of music shown in the top stanza of FIG. 6 ("Sound 1"), analog switches 681L and 681R shown in FIG. 4 are controlled to be ON during all four measures so as to output the melody output generated by sound generating circuit 541 to both of amplifiers 60L,60R during all four measures. Thus, the value of "1" would be written into bits D0 and D4 of register NR51 for the duration of all four measures.

In contrast, the output of sound generating circuit 542 alternates between the left and the right channels S01,S02 as shown in stanza labelled "Sound 2" in FIG. 6. Thus, the output of sound generating circuit 542 is provided to sound output S01 but not to sound output S02 during the first measure; is provided to both sound outputs S01,S02 during the second measure; is provided to only sound output S02 and not to sound output S01 during the third measure; and is provided to both of sound outputs S01,S02 during the fourth measure. Hence, in the first measure the CPU writes the value of "1" into register NR51 bit D1 and the value of "0" into register NR51 bit D5. In the second measure values of "1" are written to both bits D0 and D5 of register NR51 so that analog switches 682L,682R are both turned ON and output of sound generating circuit 542 is passed to both of output channels S01,S02. During the third measure, conversely to the first measure, the "0" is written to register NR51 bit D1 and a "1" is written to bit D5 of register NR51 to turn OFF analog switch 682L and turn ON analog switch 682R (so that the output of sound generating circuit 542 provided to output channel S02 but not to output channel S01).

Similarly, the "sound 3" line of musical notation shown in FIG. 6 indicates that the output of sound generator circuit 543 is to alternate between channels S01 and S02. That is, during the first measure, analog switch 683L is turned ON (by writing a logic level "1" to register NR51 bit D2) and analog switch 683R is turned OFF (by writing a bit "0" value to register NR51 bit D6). Therefore during the first measure, the output of sound generating circuits 543 is applied to sound output channel S01 but not to sound output channel S02. But in the second measure, conversely, the value "0" and "1" are respectively written into register NR51 bits D2 and D6 to turn OFF analog switch 683L and turn ON analog switch 683R. Therefore, the output of sound generating circuit 543 is provided only to sound output channel S02 and not to sound output channel S01.

In a similar manner, the output sound generating circuit 544 may be routed as is shown in the lowest line of musical notation ("sound 4") of FIG. 6) by writing the values "1" and "0" to register NR51 bits D3,D7 during the first measure; thereafter writing the values "0" and "1" to bits D3,D7, respectively during the second measure; writing the value "1" and "0" to bits D3,D7 during the third measure, et cetera.

It will be understood that registers NR50–NR52 are typically written in parallel so that, for example, all of bits D0–D7 of register NR51 are typically rewritten each time any channel allocation bit is to be changed.

Thus, the melody sounds produced by sound generating circuit 541 in accordance with exemplary music shown in FIG. 6 and the rhythm sounds produced by sound generating circuits 542-544 in accordance with that exemplary music are selectively turned ON and OFF by means of analog switches 681L-684R, and the four sound source signals are mixed appropriately by left and right audio buses 300,302 and provided respectively to solid-state volume controls 72L,72R. The output levels of these mixed signals are independently controlled by solid-state volume control blocks 72L,72R in accordance with the contents of register NR50 bits D0–D2, D4–D6 such that the separate sound outputs S01 and S02 for the left and right audio channels (in which the melody and rhythm sounds are combined or synthesized) can be outputted from amplifiers 60L,60R.

By changing the amplification of one of volume control blocks 72 with respect to the amplification of other volume control block, it is possible to alter the spatial relationship perceived by the wearer of headset 64 (so that the sound source appears to have moved in position with respect to the user's head).

Exemplary Sound Generating Circuits

FIG. 5 is a detailed schematic block diagram of an exemplary configuration for an exemplary one of sound generator circuits 541-544. Although only one sound generator circuit is illustrated in FIG. 5, the four sound generator circuits 541-544 may be similar to one another in structure and operation and in any event, description of one of the generator circuits will provide sufficient details to one of ordinary skill in the art with respect to all four of the circuits. Thus, only one of the four sound generator circuits needs to be described in detail herein. In the preferred embodiment, sound generator circuits 541-544 are not in fact identical to one another as some of the sound generator circuits include enhanced capabilities in order to provide varied sound effects. Sound generator circuit 541 may, for example, include a sweep oscillator, sound generator 543 may include no duty cycle control, and sound generator 544 may include a polynomial counter clock type frequency selector—all as is well understood by those skilled in this art.

Referring now to FIG. 5, sound generator circuit 542 includes various counters, dividers and other components controlled by control registers NR21-NR24. Briefly, components 74-94 provide a clocking signal used to enable/disable conversion by a D/A converter 96 of the contents of an envelope counter 102 into a sound output signal. Thus, components 74-94 control timing parameters associated with the sound output signal, and envelope counter 102 and associated components 98-106 control the amplitude of the sound output signal. Decoder 108 is used to reset the sound generator circuit 542, as will be explained.

A reference clock signal at frequency f (which preferably is provided by the crystal controlled oscillator 24a and associated components shown in FIG. 2 in the preferred embodiment) provides a time base for the sound generating circuit 542 shown in FIG. 5. This clock frequency signal may be, for example, 4.194,304 MHz in the preferred embodiment. In addition, additional fixed frequency clock signals (e.g., having frequencies of 64 Hz and 256 Hz) obtained by dividing down clock frequency f, for example, may also be provided to sound generating circuit 542.

The reference clock signal f is applied in the preferred embodiment to the input of a divide-by-four divider circuit 74 (which may comprise, for example, a pair of flip-flops forming a two-bit counter). Divide-by-four circuit 74 divides clock frequency f by a factor of 4 in a well-known manner, and applies this divided-frequency signal to one input of an AND gate 76. The other input of AND gate 76 is connected to the Q output of a flip-flop 80. Flip-flop 80 is used in the preferred embodiment to enable and disable sound generating circuit 542 by effectively gating (via AND gate 76) the divided clock frequency f to the input of frequency counter 82. Flip-flop 80 is set in accordance with the value of the most significant bit D7 of register NR 24 (see FIG. 5b). Thus, when a logic level "1" is written into register NR24 most significant bit D7, flip-flop 80 sets—thereby turning AND gate ON so as to pass the divided clock frequency output from divider 74 to the clock input of frequency counter 82. Flip-flop 80 resets in response to the output of decoder 108 in the preferred embodiment, as will be explained shortly.

A frequency counter 82 in the preferred embodiment controls the frequency (pitch) of the audio output signal to be produced. In the preferred embodiment, frequency counter 82 comprises a programmable frequency divider of conventional design. The division ratio of the dividing performed by frequency counter 82 is determined by frequency data contained within registers NR23 and NR24. In particular, the least significant three bits D0–D2 of register NR24 contain the three most significant bits of an 11-bit frequency data value, while all eight bits D0–D7 of register NR23 are used as the lower 8-bit portion of this frequency data value. In the exemplary circuit shown, the 11-bit frequency data value stored within registers NR23, NR24 controls frequency counter 82 to produce an output signal of frequency $f_d$ at a frequency $$f_d = 4194304/(4*2^3(2048-X))$$

where $f_d$ is in Hz and x is the 11-bit frequency value. This frequency data value x controls the musical pitch (i.e., "interval") of the signal produced by sound generating circuit 542.

The output of frequency counter 82 is applied to the input of a duty cycle circuit 88. Duty cycle circuit 88 controls the duty cycle of the audio output signal produced by sound generating circuit 542 in response to the contents of a duty ratio setting register 86. In the exemplary arrangement shown, the duty cycle is specified by the two most significant bits D6–D7 of register NR21. As is well known, a waveform duty cycle relates to the amount of time a periodic waveform is ON with respect to the amount of time that periodic waveform is OFF. Thus, a 50% duty cycle (set by a value of "00" in register NR21's most significant bits D6–D7) means that the periodic waveform is ON as often as it is OFF. Writing a value of "11" into register NR21 most significant bits D6–D7 selects a waveform duty cycle of 75% in the preferred embodiment (thus providing an output waveform that is ON one and a half times as much as it is OFF). In similar fashion, writing a value of "01" into register NR21 most significant bits D6–D7 provides a 25% waveform duty cycle (i.e., the waveform is ON only half as much as it is OFF), and writing a value of "01" into these most significant bits provides a waveform duty cycle of 12.5%. As is well known, changing the duty ratio of an audio signal changes its tone color—thereby providing a variety of different sound possibilities for the same frequency signal.

In the preferred embodiment, duty circuit 88 is a conventional circuit arrangement which varies the duty cycle of the periodic signal provided by frequency counter 82 to provide one of the four duty cycles described above.

The output of duty circuit 88 is provided to one input of an AND gate 90, which AND gate gates the output of the duty circuit under control of a length duration gating signal produced by a length counter 94. Length counter 94 produces this duration gating signal in response to the contents of a length setting register 92. Length setting register 92 in the preferred embodiment actually comprises the least significant bits D0–D5 of register NR21 shown in FIG. 5B. The contents of length setting register 92 controls the division ratio of length counter 94—which counter acts as a conventional programmable divider to divide the frequency of a length clock frequency signal of 256 Hz. In the preferred embodiment, sound length field D0–D5 of register NR21 controls the duration of sounds produced by sound generating circuit 542 in sixty-four steps in accordance with the following relation:

$$\text{Duration} = (64 - T1)*(1/256) \text{ seconds}$$

where "Duration" is the length of a musical sound and T1 is the value specified by register NR21 bits D0–D5. By gating the output of duty circuit 88 via AND gate 90, length counter 94 controls the duration of sounds produced by sound generating circuit 542. Thus, the sound generating circuit 542 may "turn OFF" automatically at the end of each musical note to save the CPU the effort of turning the sound generating circuit OFF at the appropriate time. By writing appropriate values into length setting register 92, the CPU can control sound generating circuit 542 to produce, for example, a musical note of any desired duration (for example, a sixteenth note, an eight note, a quarter note, a dotted half note, or a whole note)—and similarly, the length of a musical rest may also be set in this manner.

The resulting gated signal provided for at the output of AND gate 90 is applied to the enable input of digital-to-analog (D/A) converter 96. D/A converter 96 actually produces an analog output level corresponding to the sound output of sound generating circuit 542 at timings controlled by the output of AND gate 90 (and thus depending upon the selected frequency, duty cycle and duration discussed above). The amplitude of the signal produced by D/A converter 96 may be fixed for some notes, but is capable of increasing or decreasing automatically to produce other musical notes or sound effects in the preferred embodiment.

Envelope counter 102 and associated components 98–106 provide parallel data to the parallel data input of D/A converter 96 so as to control automatically the amplitude "level" of the sound output signal produced by the converter with respect to time (the "envelope" of a sound refers to the amplitude envelope containing it).

A relatively slow (e.g., 64 Hz) envelope clock signal is applied to the input of a programmable 1/N divider 100 in the preferred embodiment. The division ratio provided by 1/N divider 100 is selected by the contents of envelope step number register 98. Envelope step register 98 in the preferred embodiment comprises the least significant three bits D0–D2 of register NR22. In the preferred embodiment, 1/64th of a second is the fastest that the envelope "amplitude" of the sound may be changed. However, the contents of envelope step number register 98 selects the rate of change of the sound output amplitude in each step in accordance with the following relation:

$$\text{Duration of step} = N*(1/64) \text{ seconds}$$

where N is the value stored in bits D0–D3 of register NR22. In the preferred embodiment, the value of "000" stored in these bits stops the operation of the envelope counter (so that the amplitude of the sound output produced by D/A converter 96 remains constant).

The output of 1/N divider 100 controls the rate at which an envelope counter 102 counts up or down. A 4-bit initial value is loaded in parallel into envelope counter 102 from envelope initial value register 104 (which in the preferred embodiment comprises the four most significant bits D4-D7 of register NR22). In addition, an up/down register 106 (which in the preferred embodiment comprises bit D3 of register NR22) selects whether envelope counter 102 is to count up or instead is to count down (thus providing two options: an amplitude which begins at the initial value and increases to maximum, and an amplitude which begins at the initial value and decreases to zero). In the preferred embodiment, up/down register 106 may control the direction of counting of envelope counter 102, or alternatively may provide an input to D/A converter 96 which instructs the D/A converter how to interpret (i.e., attenuate or amplify) the value presented to it by envelope counter 102.

Envelope counter 102 thus starts counting at the initial value provided by envelope initial value register 104 and counts up (or down) at a rate determine by the output frequency of 1/N divider 100. As envelope counter 102 counts, its parallel output value changes—and since its parallel value is converted into an analog signal level by D/A converter 96, the amplitude of the sound output signal produced by the converter likewise changes.

A decoder 108 receives the parallel data provided by envelope initial value register 104 and the data provided by up/down register 106. Decoder 108 decodes this data and, when the envelope initial value is zero and a down direction is designated, the decoder 108 applies a decoded output to the reset input of flipflop 80 and to D/A converter 96. The effect of this reset signal is to disable the operation of D/A converter 96 (so that no sound output is provided) and to disable AND gate 76 (thereby disabling the entire sound generating circuit 542).

Exemplary Sound Generation Program Control Instructions and Data Structures

Exemplary program control steps and associated data structures for controlling the operation of exemplary sound generator 58 will now be described in connection with FIGS. 7A-9D.

Figure 9A:
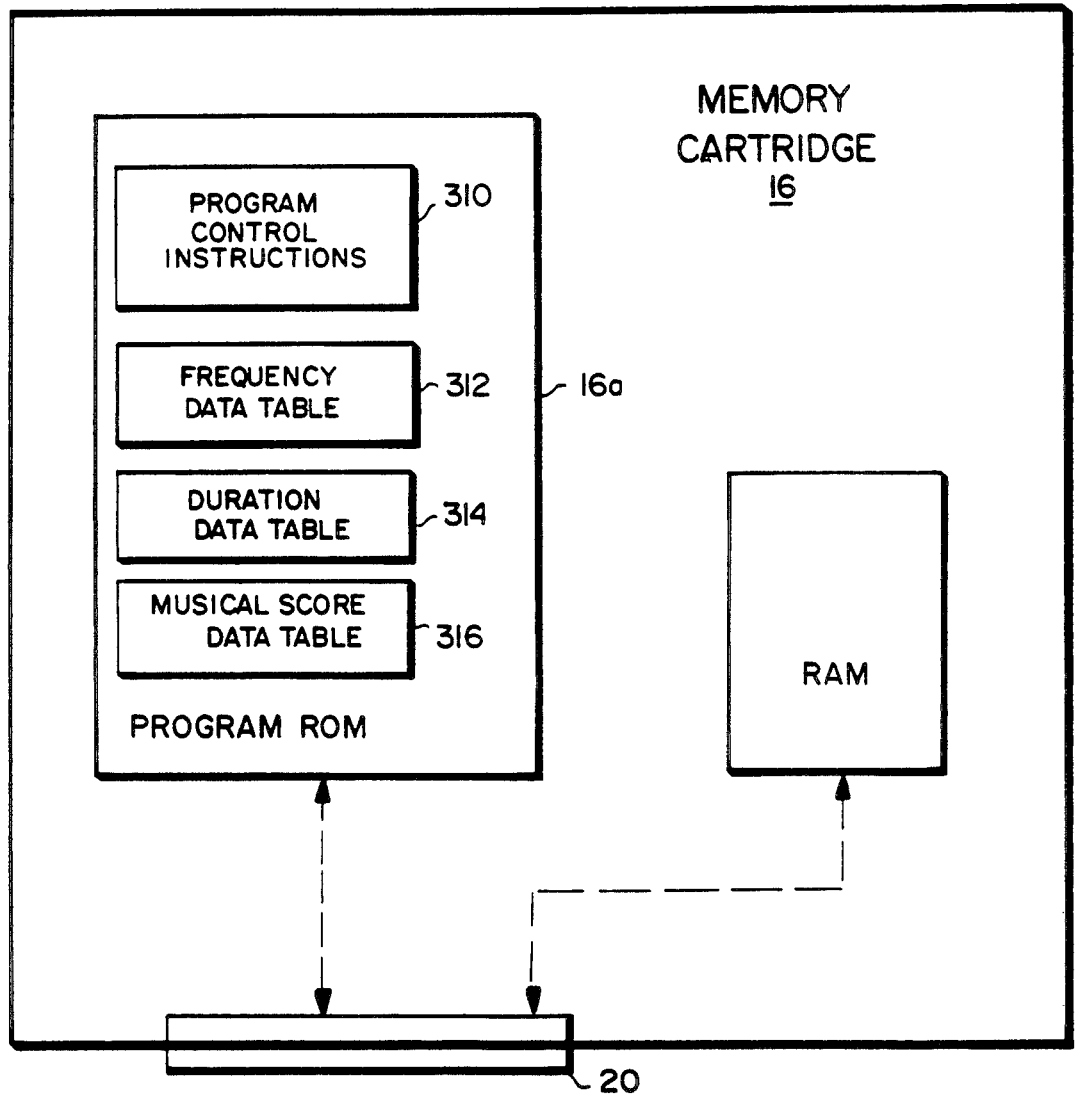

Referring now more particularly to FIG. 9A, in the external read only memory (ROM) 16a within memory cartridge 16 are stored suitable program control instructions 310 for controlling sound generation (in addition to other aspects of video game play, such as control of the video game displayed by LCD display panel 14, response to user inputs provided by control 18, and the like).

In addition, ROM 16a stores three data structures in the preferred embodiment relating to sound generation: a frequency data table 312, a duration data table 314 and a musical score data table 316. Briefly, musical score data table 316 provides the musical pitch, duration and "sound direction" (left channel, right channel or both) set forth in FIG. 6 for each of sound converting circuits 541-544. Frequency data table 312 performs a mapping or conversion between the musical pitch information stored in musical score data table 316 and the digital values that need to be loaded into frequency setting register 84 of sound generating circuits 541-544 to provide the musical pitches specified by the musical score data table 316. Duration data table 314 provides a mapping or conversion between the duration information set forth in musical score data table 316 and the sound length data that needs to be written into sound length setting register 92.

FIG. 9B is an exemplary schematic block diagram of the contents of frequency data table 312 shown in FIG. 9A. In the preferred embodiment, each musical pitch is defined by a sequence of four hexadecimal values scored in frequency data table 312. For example, a musical rest (i.e., no sound) may be represented by the value of "0000", the musical pitch of C may be represented by "AB01", the musical of C sharp may be represented by "0193", etc. In the preferred embodiment, frequency data table 312 stores such values in the order of a chromatic scale beginning with the musical rest, followed by the pitch of C, and ascending in pitch through each half step (e.g., C, C#, D, E$^b$ (D#), E, F, etc.). The hexadecimal data values stored in frequency data tables 312 correspond to the digital values which, when loaded into the frequency data registers associated with sound generating circuits 541-544 (e.g., bits D0-D7 of register NR23 and bits D0-D2 of register NR24 as discussed previously) will result in the generation of a frequency by the associated sound generating circuit corresponding to the defined musical pitch. That is, for example, when the hexadecimal value "AB01" is written to register NR23,NR24, sound generating circuit 542 will produce a sound having the frequency (pitch) of C. By storing the digital values in frequency data table 312, the programmer writing program control instruction 310 need not worry about the specific digital values that must be loaded into the sound control registers to provide notes of desired pitches. As will be understood shortly, the programmer need only specify the appropriate address index from the base address FREQD where frequency data table 312 begins into the frequency data table to specify the appropriate pitches he desires. Frequency data table 312 then provides automatic conversion of this address offset into the appropriate data for writing to, for example, registers NR23 and NR24.

Similarly, duration data table 314 stores data corresponding to commonly-used note durations (e.g., sixteenth note or rest, eight note or rest, quarter note or rest, half note or rest, whole note or rest, dotted quarter note or rest, dotted half note or rest, etc). In the exemplary embodiment shown, duration data table 314 is stored beginning at a base address ONPU and stores as its first entry the hexadecimal value "06" corresponding to the duration of a sixteenth note. That is, the duration of the value "06" when loaded into the least significant six bits of register NR21 described previously, will cause sound generating circuit 542 to produce a note or a rest having a length corresponding to a sixteenth note at some predetermined fixed tempo in the preferred embodiment. Different commonly-used musical durations are stored in duration data table 314 in a predetermined order. The programmer need not, therefore, worry about the specific values that need to be written to sound length bits D0-D5 of register NR21 (for example) to obtain a desired musical duration. Rather, he need only specify the appropriate offset into duration data table 314 to select which of the commonly-used musical durations he wishes to use.

FIG. 9D is an exemplary schematic diagram of musical score data table 316. Musical score data table 316 shown in FIG. 9D corresponds to the "sound 2" (second) line of exemplary music shown in FIG. 6. As will be understood, similar is data preferably provided for the other three lines, and data corresponding to all four lines of music are read substantially in parallel from ROM 16a to provide four simultaneously lines of music. In the preferred embodiment, musical score data table 316 begins at a base address of BASE and includes three entries of two hexadecimal numbers each for each note or rest represented within the FIG. 6 musical score. The first two-number hexadecimal value corresponds to the offset into duration data table 314 corresponding to the duration of the note or the rest. The second two-number hexadecimal value corresponds to the offset into frequency data table 312 corresponding to the desired pitch. The last two-number hexadecimal value (which may actually be a binary value in the preferred embodiment since only four states need to be represented) specifies the "sound direction" of the sound (i.e., left channel, right channel, both channels, or no channels).

Thus, for example, the first note in the first measure of the "sound 2" line of music shown in FIG. 6 is a quarter rest. Accordingly, the first entry in musical score data table 316 specifies the offset into duration data table 314 of "01", corresponding to a quarter note or rest. The second entry in musical data table 316 specifies a zero offset into frequency data table 312 to specify a rest (as opposed to a note). The third and last entry corresponding to the first measure, first note, is the value "02"—specifying that the sound is to be directed only to output sound channel S01 and not to output sound channel S02.

Musical score data table 316 provides a sequence of such sets of data corresponding to the sequence of notes of a melody or rhythmical line. Thus, for example, the next three two-number hexadecimal values stored in the musical score data table 316 correspond to the second note of the first measure of the "sound 2" line shown in FIG. 6—a quarter note having the pitch of E. The first two-number hexadecimal value in this data set is "02"—corresponding to the offset into duration data table 314 specifying the duration of a quarter note. The second two-number hexadecimal value in this data set specifies an offset of "0A" into frequency data table 312—corresponding to the pitch of E. The last value in this data set corresponds to sound direction "01"—specifying that the note is to be provided only to sound output channel S01 and not to sound output channel S02.

It will thus be understood that an entire line of music may be transcribed and stored into musical score data table 316 in the form shown in FIG. 9D. To "play" the music represented by the score, it is only necessary to read the data sets in the order set forth in the musical score data table 316, reference the duration data 314 and frequency data table 312 to map the duration and pitch information into the corresponding values to be loaded into the appropriate sound control registers, and then actually load sound registers with the resulting data. Once a note has terminated, the data set corresponding to the next note in the musical sequence may then be read from the musical score data table 316 and the entire process repeats once again to generate the next note. This overall process may be repeated continually until the end of the musical score data table 316 is reached (at which time, if desired, the musical score data table 316 may be read again from the beginning to result in repetition of the musical piece over and over again).

Figure 7A:
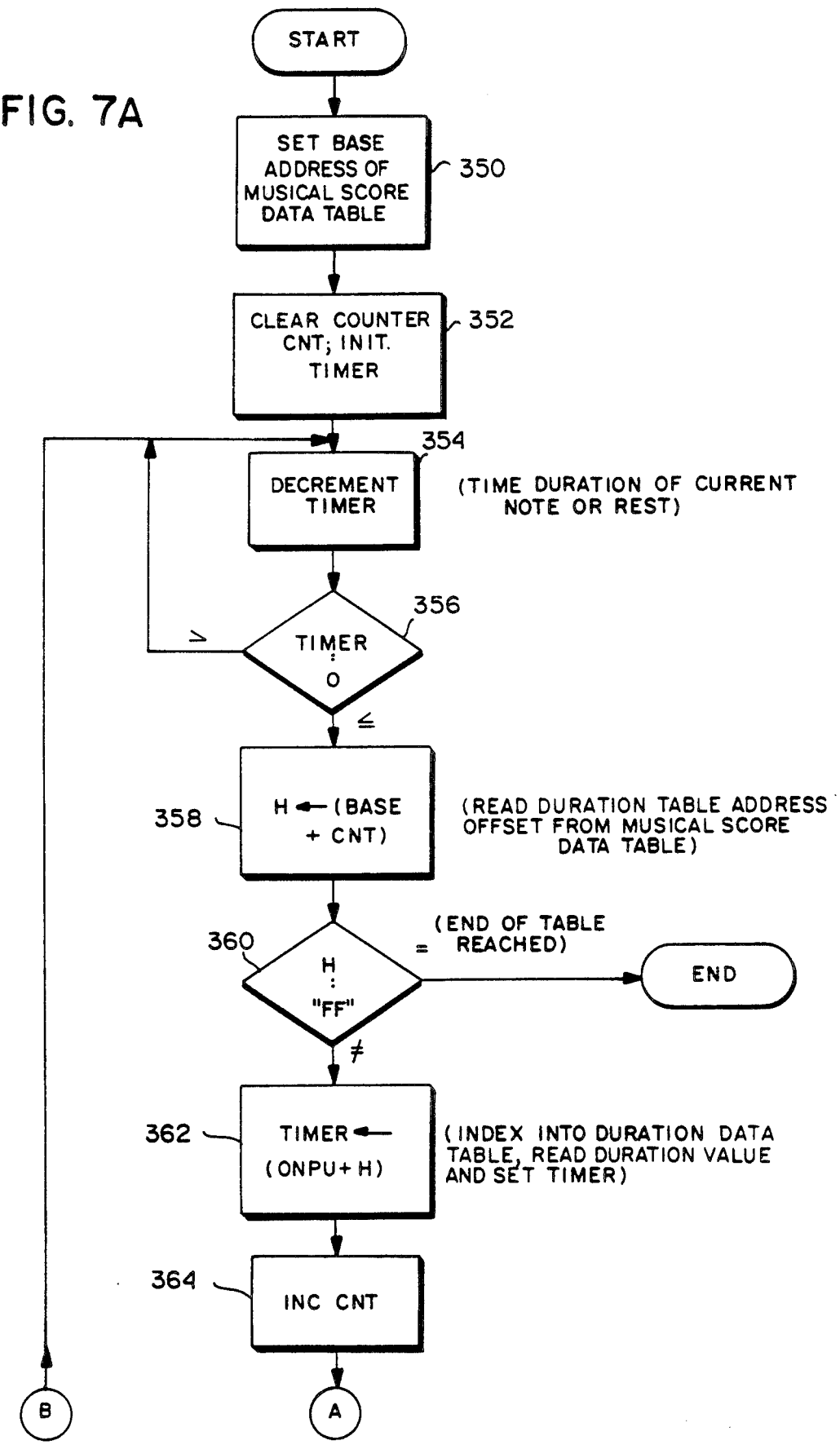
FIGS. 7A-7B are together a schematic flow chart of exemplary program control steps performed by the FIG. 2 microcomputer in the preferred embodiment to generate the music represented by the FIG. 6 sheet music.
Figure 7B:
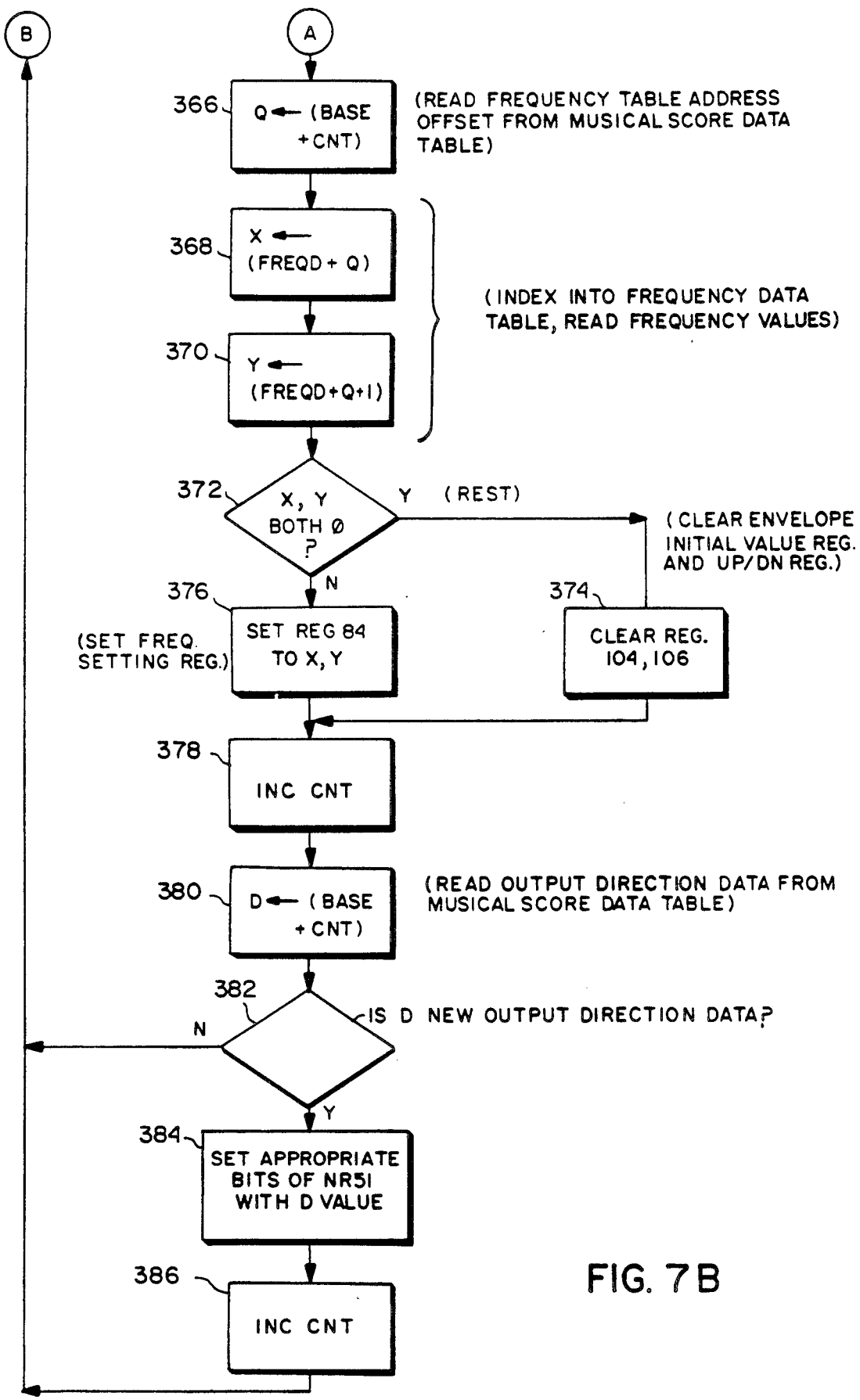

FIGS. 7A and 7B together are a schematic flow chart of exemplary program control steps embodied in the program control instructions 310 shown in FIG. 9A resulting in sound control of (for example) the line of music stored in the musical score data tabe 316 shown in FIG. 9D. It will be understood that several versions of the exemplary program control steps shown in FIG. 7A-7B should preferably be executed simultaneously (essentially in parallel) to provide multiple musical line generations via individual sound generating circuits 541-544. In other words, the exemplary program control steps shown in FIG. 7A-7B control only a single sound generating circuit (e.g., circuit 542). Other iterations of the exemplary program steps should be preformed by CPU 24 to control the other sound generating circuits (e.g., 541,543,544).

Upon initializing the routine shown in FIGS. 7A-7B, the BASE address (i.e., the starting address) of the appropriate musical score data table 316 is obtained and written to a memory pointer register (block 350) to designate a particular musical score data table (as will be understood, more than one musical score data table 316 may be stored in program ROM 16a to provide multiple different possible pieces of music or sound effects that may be reproduced). A musical note trace counter CNT (preferably a register within CPU 24 or a location in RAM) is then cleared and a timer (e.g., the timer 24d shown in FIG. 2) is initialized (block 352). Initially, the value of the timer may be set to "01" so that it can immediately be decremented and the remainder of the routine shown executed. The timer is then decremented (block 354) and its value tested to determine whether it is yet zero (decision block 356). If the timer is greater than zero, control returns to block 354 to once again decrement the timer and blocks 354,356 are repeatedly executed until the timer has been decremented to the value of zero. The loop formed by blocks 354,356 times the duration of the current note or rest, as will be understood, and may be interrupt driven by hardware timer 24d in a well-known manner if desired.

The first two-number hexadecimal value stored in the musical score data table 316 is then accessed by adding the BASE address to the current CNT value, accessing the program ROM 16a to read the contents stored at that location, and storing those contents into a temporary location called H (block 358). The contents of H are then compared with the value of "FF" to determine whether the end of musical score data table 316 has been reached (decision block 360) (in the preferred embodiment the end of the table may be marked by writing the value of "FF" or some other value not a valid offset into the duration data table 314). Assuming the contents of H is a valid offset into the duration data table 314, an address into the duration data table is calculated using H as an offset from the base address ONPU of the table, the contents stored within the duration data table 314 at the resulting calculated address is read, and those contents are loaded into the timer (block 362). The timer thus is initialized with the duration of the next note or rest to be produced. This retrieved value may also be loaded into the sound control register sound length data (e.g., NR11 bits D0-D5) to relieve CPU 24 from having to actively turn OFF the sound generating circuit when the end of the note is reached.

The value of counter CNT is then incremented (block 364) so as to access the next two-number value within the musical score data table 316. This next location in the musical score data table is accessed (e.g., by calculating an address based on the BASE address and the sum of CNT), and its contents are read and stored into a temporary holding location Q (block 366). The offset into the frequency data table 312 now stored in temporary storage location Q is used to address the frequency data table 312 (blocks 368,370). In the preferred embodiment, a double read of two sequential locations of the frequency data table 312 is required at this point to retrieve enough information to specify the 11-bit frequency data stored in, for example, NR13-NR14. These values are retrieved from frequency data table 312 and stored in temporary storage locations X,Y (blocks 368,370), and the contents of the temporary storage locations X,Y are then tested to determine whether they are all zero, indicating that the current sound to be produced is a rest rather than a note (decision block 372). If the current sound is a rest, the envelope initial value register and the up/down register 104,106 of the corresponding sound generating circuit (e.g., 542) are cleared to disable the sound generating circuit from generating sounds (block 374). If, on the other hand, the retrieved value corresponds to a pitch instead of to a rest (the "N" exit of decision block 372), the frequency setting register 84 is set with the value stored in temporary value storage locations X,Y (block 376) so as to define the pitch of the musical note to be produced.

The CNT counter is then incremented (block 378) and the third value stored in the musical score data table 316 is read corresponding to "sound direction" data (block 380). This retrieved data is then tested to determine whether it corresponds to new output direction data (decision block 382). In the preferred embodiment, although the left or right "sound direction" data is shown in FIG. 9D as being explicitly specified for each and every note and rest defined by the musical score data table 316, it may be desired (e.g., for the purposes of conserving memory) to specify sound direction data only when the sound direction corresponding to a particular sound generating circuit has changed with respect to the prior notes in the sequence. Thus, it is possible in the preferred embodiment for some of the data sets stored in the musical score data table 316 to have only two two-number hexadecimal values instead of three (with sound direction data thus omitted if the sound direction is the same as that of the last note played). Decision block 382 shown in FIG. 7B determines whether new sound direction data has been read, and if so, the appropriate bits of the appropriate sound control register (e.g., register NR51 bits D1,D5) are set in accordance with the values obtained by block 380 (block 384), and the counter CNT is incremented (block 386) so that it now points to the beginning of the next data set stored in the musical score data table 316. If the value read by block 380, on the other hand, is not new sound direction data, the incrementing of counter CNT is not performed by block 386 and control returns to block 354,356 shown in FIG. 7A.

Once control returns to block 354,356, the timer is decremented to time the duration of the current note or rest. Once that duration lapses, the process of blocks 358-386 are repeated again for the next musical note or rest to be generated.

Stereo/Mono Selecting Circuit

FIG. 8 is a schematic circuit diagram of the stereo/mono selecting circuit 202 shown in FIG. 4. Selecting circuit 202 receives the left channel sound signal S01 from amplifier 60L and the right channel sound signal S02 from amplifier 60R, and routes appropriate signals to either loudspeaker 120 or to stereophonic headset 64. In particular, if no stereophonic headset 64 plug is connected to earphone jack 122, stereo/mono selecting circuit 202 mixes the left and right channel sound signals S01, S02 together to provide a monophonic signal and applies the monophonic signal to loudspeaker 120. If, on the other hand, a stereophonic headset 64 is connected to earphone jack 122, then stereo/mono selecting circuit 202 couples the left channel sound signal S01 to the left ear transducer of the headset and couples the right channel sound signal S02 to the right ear transducer of the headset.

In the preferred embodiment, the output of amplifier 60L shown in FIG. 4 is coupled to the input of an amplifier 114L through a series resistor 112L, and similarly, the output of amplifier 60R shown in FIG. 4 is coupled to the input of an amplifier 114R through a series resistor 112R. Resistors 116L, 116R are connected in series across the inputs of amplifiers 114L, 114R. The node connecting resistors 116L, 116R together is coupled to the input of a mono amplifier 118. The effect of resistors 116L, 116R is to mix together the S01 and S02 signals and provide the resulting mixed (monophonic) signal to amplifier 118. Amplifier 118 drives loudspeaker 120.

An earphone jack 122 includes a left channel audio contact 112L, a right channel audio contact 122R, and a pair of switching contacts 122P. An earphone plug 124 coupled to earphone 124 is designed to accept and mate with earphone jack 122. Earphone jack 122 may for example be a female mating part which mates with earphone plug 124 as a male mating part. Earphone plug 124 may thus be inserted into earphone jack 122 to connect the headset 64 to the outputs of amplifiers 114L, 114R, and may thereafter be removed from the earphone jack to disconnect the headset from the amplifiers. For example, sometimes the user may wish to listen to the sound produced by sound generator block 58 in the headset 64 (and may at that time connect the earphone plug 124 into the jack 122). At other times the user may not wish to use the headset and may disconnect the earphone plug 124 from the earphone jack 122 (so as to listen to the sounds on loudspeaker 120 rather than on the headset 64).

Earphone plug 124 includes a left channel contact 124L which establishes electrical contact with earphone jack left channel audio contact 112L when the plug and jack are mated; and a right channel contact 124R which establishes electrical contact with earphone jack right channel audio contact 112R when the plug and jack are mated. A grounded portion 124G is preferably connected to ground. The plug left channel contact 124L is connected via a left channel lead 126L to the left channel transducer of headset 64; and the plug right channel contact 124R is connected via a right channel lead 126R to the right channel transducer of headset 64.

Whenever the earphone plug 124 is inserted into the earphone jack 122, contacts 122P contact one another to establish an electrical connection between ground and the inputs of inverting amplifier 130 and non-inverting amplifier 132. This ground connection causes inverting amplifier 130 to generate a logic level "1" signal which it applies to enable amplifiers 114L, 114R to operate. The ground connection also causes non-inverting amplifier 132 to generate a logic level "0" signal to disable amplifier 118 from operating. In this state, a stereophonic signal is supplied by amplifiers 114L, 114R to headset 64 via contacts 122L, 122R and 124L, 124R, and loudspeaker 120 is disabled.

Whenever earphone plug 124 is disconnected from earphone jack 122, on the other hand, contacts 112P no longer contact one another. A pull-up resistor 128 connected to power supply potential pulls up both the input of inverting amplifier 130 and the input of non-inverting amplifier 132 to logic level "1". This logic level high level causes inverting amplifier 130 to apply a logic level "0" signal to amplifiers 114R, 114L (thereby disabling them from operating) and causes the non-inverting amplifier 132 to apply a logic level "1" signal to amplifier 118 (thereby enabling the amplifier to operate). In this state, a monaural signal is synthesized (mixed) by amplifier 118 and is applied to loudspeaker 120. No signals are applied by amplifiers 114L, 114R to earphone jack contacts 112L, 112R since the earphone is not connected to the jack.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A pseudo-stereo sound generating apparatus comprising:

a sound source signal generating means for generating a sound source signal at an output thereof;

a first switching means having an input terminal connected to said sound source signal generating means output and coupled to a first sound signal output terminal, said first switching means for selectively coupling said sound source signal generating means output to said first sound signal output terminal by a switching operation thereof;

a second switching means having an input terminal connected to said sound source signal generating means output and coupled to a second sound signal output terminal, said second switching means for selectively coupling said sound source signal generating means output to said second sound signal output terminal by switching operation thereof; and a switching control means coupled to said first and second switching means for generating switching signals selectively turning on and off at least one of said first switching means and said second switching means and for applying the switching signals to said first switching means and said second switching means.

2. A pseudo-stereo sound generating apparatus in accordance with claim 1, wherein:

said sound source signal generating means includes a plurality of sound signal generating circuits each providing an independent audio signal; and said first switching means and said second switching means each include a plurality of first switching circuits and a plurality of second switching circuits corresponding respectively with said plurality of sound source signal generating circuits, said plurality of first switching circuits having outputs commonly connected to said first sound signal output terminal, said plurality of second switching circuits having outputs commonly connected to said second sound signal output.

3. A pseudo-stereo sound generating apparatus in accordance with claim 1, further including:

a first level controlling means coupled to said first sound signal output terminal for controlling a level of the signal applied by said first switching means to said first sound signal output terminal and for applying said level controlled signal to a further first output terminal; and a second level controlling means coupled to said second sound signal output terminal for controlling a level of the signal applied by said second switching means to said second sound signal output terminal and for applying said level controlled signal to a further second output terminal.

4. A pseudo-stereo sound generating apparatus comprising:

a sound source signal generating means for generating a sound source signal at an output thereof;

a first switching means having an input terminal connected to said sound source signal generating means output and coupled to a first sound signal output terminal, said first switching means for selectively coupling said sound source signal generating means output to said first sound signal output terminal by a switching operation thereof;

a second switching means having an input terminal connected to said sound source signal generating means output and coupled to a second sound signal output terminal, said second switching means for selectively coupling said sound source signal generating means output to said second sound signal output terminal by switching operation, thereof;

a switching control means coupled to said first and second switching means for generating switching signals selectively turning on and off at least one of said first switching means and said second switching means and for applying the switching signals to said first switching means and said second switching means; and a storing means operatively coupled to said switching control means for storing switching control data specifying switching operation of said first switching means and said second switching means, said switching control means generating said switching signals in response to said switching controlling data stored in said storing means.

5. A memory cartridge capable of being attachably/detachably inserted into a main unit of a game machine of the type including:

a sound source signal generating means for generating a sound source signal in accordance with data provided by the memory cartridge, first and second sound signal output portions, and switching means having an input terminal connected to said sound source signal generating means and having output terminals connected to said first and second sound signal output portions, said switching means for selectively outputting the output of said sound source signal generating means to at least one of said first and second sound signal output portions through a switching operation thereof, said memory cartridge comprising:

a first storing means for storing data associated with duration of a sequence of musical notes or rests, data associated with musical pitch corresponding to each of said musical notes in said sequence, and left or right data so as to represent a sequence of musical events; and a second storing means for storing program control instructions for reading said data from said first storing means at a predetermined timing, whereby said duration associative data, said musical pitch associative data and said left or right data are provided to said game machine main unit in accordance with data read from said first storing means, and said game machine main unit sound signal generating means is controlled in accordance with said duration associative data and said musical pitch associative data, and said switching means is controlled in accordance with said left or right data read from said first storing means.

6. A memory cartridge in accordance with claim 5, wherein said first storing means includes first table storing means for storing a duration associative data table and a second table storing means for storing a musical pitch associative data table, said first table storing means storing a plurality of duration associative data representative of plurality of usable durations, said second table storing means storing a plurality of musical pitch associative data representative of a plurality of usable musical pitches, said first storing means further including musical score data table storing means for storing a musical score data table representative of said sequence of musical events, said musical score data table including offset addresses into said duration associative data table and offset addresses into said music pitch associative data table and said left or right data, whereby said duration associative data, said musical pitch associative data and said left or right data can be read in accordance with said program control instructions.

7. A memory cartridge capable of being attachably/detachably coupled to a game machine main unit of the type comprising:
a sound source signal generating means for generating a sound source signal in response to data provided by the memory cartridge, said sound source signal generating means having an output, and
a switching means input terminal connected to said sound signal generating means output and having output terminals connected to first and second sound signal outputs, said switching means for selectively coupling said sound signal generating means output to said first and second sound signal outputs by switching operation thereof,
said memory cartridge comprising:
a first storing means for storing duration associative data, musical pitch associative data and channel selection data representing sequence of stereophonic musical events; and
a second storing means for storing program control instructions for reading said data from said first storing means at a predetermined timing;
whereby said duration associative data, said musical pitch associative data and said channel selection data are provided in accordance with data read from said first storing means, and said game machine main unit sound signal generating means is controlled by said duration associative data and said musical pitch associative data and said switching means is controlled in accordance with said channel selection data.

8. A memory cartridge in accordance with claim 7 wherein said first storing means includes duration storing means for storing a duration associative data table and pitch storing means for storing a musical pitch associative data table, said duration storing means for storing in advance a plurality of duration associative data representative of a plurality of useable durations and said pitch storing means for storing in advance a plurality of musical pitch associative data representative of a plurality of useable musical pitches, and said first storing means further includes musical score storing means for storing a music score data table representative of said sequence of stereophonic musical events, said musical score storing means for storing addresses of said duration associative data table and said musical interval associative data and said channel selection data, whereby said duration associative data, said musical pitch associative data and said channel selection data can be read in accordance with said program control instructions.

9. A game machine comprising in combination:
a game machine main unit; and
a memory cartridge including a first storing means for storing data representing duration, pitch and channel selection data so as to represent a sequence of stereophonic musical events and a second storing means for storing program control instructions for reading said stored data from said first storing means, said memory cartridge being attachably/detachably coupled to said game machine main unit;
said game machine main unit including:
a sound signal generating circuit operatively coupled to said memory cartridge when said cartridge is coupled to said game machine main unit, for generating a sound source signal in accordance with said data from said memory cartridge;
plural output channels; and
a switching arrangement coupled between said sound signal generating circuit and said plural output channels, said switching arrangement routing said sound source signal to ones of said plural output channels selected in response to said channel selection data.

10. A game machine comprising in combination:
a game machine main unit; and
a memory cartridge including a first storing means for storing data representing duration, pitch and channel selection data so as to represent a sequence of stereophonic musical events and a second storing means for storing program control instructions for reading said stored data from said first storing means at a predetermined timing, said memory cartridge being attachably/detachably coupled to said game machine main unit;
said game machine main unit including:
a sound signal generating circuit operatively coupled to said memory cartridge when said cartridge is coupled to said game machine main unit, for generating a sound source signal in accordance with said data from said memory cartridge,
wherein:
said sound signal generating circuit includes an output; and
said game machine further comprises:
a first sound signal output terminal;
a second sound signal output terminal; and
switching means having an input terminal connected to said sound source signal generating circuit and output having an output connected to said first and second sound signal output terminals, said switching means for selectively coupling said sound source signal generating circuit output to said first and second sound source signal output terminals by switching operation thereof;

wherein said first storing means includes means for storing left and right channel selection data; and said game machine further includes means for coupling said first sound signal output terminal to a left signal output and for coupling said second said signal output terminal to a right signal output when said switching means is controlled in accordance with said left or right channel selection data.

11. A game machine comprising in combination:

a game machine main unit; and a memory cartridge including a first storing means for storing data representing duration, pitch and channel selection data so as to represent a sequence of stereophonic musical events and a second storing means for storing program control instructions for reading said stored data from said first storing means at a predetermined timing, said memory cartridge being attachably/detachably coupled to said game machine main unit;

said game machine main unit including:

a sound signal generating circuit operatively coupled to said memory cartridge when said cartridge is coupled to said game machine main unit, for generating a sound source signal in accordance with said data from said memory cartridge;

an earphone jack including left and right contacts connected to said left and right signal outputs for coupling to left and right channel transducers or a stereophonic earphone when said earphone is coupled thereto, said earphone jack having at least one further contact;

a left signal path connecting said left signal output to said left contact of said earphone jack;

a right signal path connecting said right signal output to said right contact of said earphone jack;

a synthesized signal path connected to said left signal path and said right signal path to synthesize said left signal and said right signal with each other, said synthesized signal being coupled for application to a speaker; and a disabling means connected to said earphone jack further contact for disabling said synthesized signal path when said earphone is coupled to said earphone jack and for disabling said left signal path and said right signal path when said earphone is not coupled to said earphone jack.

12. In an electronic gaming system of the type comprising a main unit including a digital processor connected to control a two-dimensional display and connected to receive input from an input device manipulable by a user, said main unit disengageably coupling with a interchangeable memory cartridge, said memory cartridge supplying program control instructions to said digital processor, said digital processor providing a changing game display on said two-dimensional display at least partially in response to said received input and said program control instructions, a method of generating stereophonic sound effects including the following steps:

(a) providing data representing an audio signal;

(b) generating said audio signal in response to said provided data;

(c) providing sound direction data specifying whether said audio signal is to be provided at a first audio channel output and specifying whether said audio signal is to be provided at a second audio channel output; and (d) routing said audio signal to said first audio channel output and/or to said second audio channel output in response to said sound direction data.

13. A method as in claim 12 wherein said providing steps (a) and (c) each include following steps:

storing data beforehand in said memory cartridge, and supplying said stored data from said memory cartridge to said digital processor.

14. A method as in claim 12 wherein said generating step (b) includes the step of electronically synthesizing said audio signal in response to said provided data.

15. A method as in claim 12 wherein said routing step includes the following steps:

operating a first switching element to couple said audio signal to said first audio channel output in response to said first sound direction data; and operating a second switching element to couple said audio signal to said second audio channel output in response to said second sound direction data.

16. In an electronic gaming system of the type comprising a main unit including a digital processor connected to control a two-dimensional display and connected to receive input from an input device manipulable by a user, said main unit disengageably coupling with a interchangeable memory cartridge, said memory cartridge supplying program control instructions to said digital processor, said digital processor providing a changing game display on said two-dimensional display at least partially in response to said received input and said program control instructions, a method of generating stereophonic sound effects including the following steps:

(a) providing, within said cartridge, first data representing characteristics of a sound and sound direction data selecting any of a first audio channel output and a second audio channel output;

(b) supplying said first data and sound direction data to said digital processor;

(c) generating an audio signal in response to said supplied first data; and (d) controlling application of said audio signal to said first audio channel output and/or to said second audio channel output in response to said sound direction data.

17. In an electronic gaming system of the type comprising a main unit including a digital processor connected to control a two-dimensional display and connected to receive input from an input device manipulable by a user, said main unit disengageably coupling with a interchangeable memory cartridge, said memory cartridge supplying program control instructions to said digital processor, said digital processor providing a changing game display on said two-dimensional display at least partially in response to said received input and said program control instructions, said memory cartridge comprising:

means for storing first data representing characteristics of a sound and sound direction data selecting any of a first audio channel output and a second audio channel output and for supplying said first data and sound direction data to said digital processor; and means for operative coupling to said digital processor for controlling said processor to control generation an audio signal in response to said supplied first data for controlling said processor to control application of said audio signal to said first audio channel output and/or to said second audio channel output in response to said sound direction data.

18. A memory cartridge as in claim 17 wherein said processor controlling means comprises means for storing predetermined program control instructions.

19. A memory cartridge capable of being attachably/detachably loaded to a main unit of a game machine of the type including a sound source signal generating means for generating a sound source signal in accordance with program data, a first sound output portion for outputting sound of a left channel, a second sound output portion for outputting sound of a right channel, a first switching means having an input terminal, said first switching means being turned-on in response to a first switching signal and applying a sound source signal from said sound source signal generating means to said first sound output portion, and a second switching means having an input terminal which is connected to said sound source signal generating means, said second switching means being turned-on in response to a second switching signal and applying a sound source signal from said sound source signal generating means to said second sound output portion, said memory cartridge comprising:

first storing means for storing a musical score table, said musical score table including at least data associated with duration of a sequence of musical notes or rests, data associated with musical pitch corresponding to each of said musical notes in said sequence, and said first and second switching signals for controlling said first and second switching means for each of said musical notes so as to represent a sequence of musical events; and second storing means for storing program control instructions for reading said data and said first and second switching signals from said first storing means at a predetermined timing, whereby said first and second switching signals read from said first storing means in accordance with said program control instructions are applied to said first and second switching means in association with that said sound source signal is generated by said sound source generating means in accordance with said duration associative data and said musical pitch associative data read from said first storing means in accordance with said program control instructions, and sound is generated from at least one of said first and second sound output portions.

20. A memory cartridge in accordance with claim 19, wherein said game machine includes a plurality of said sound source signal generating means, a plurality of said first switching means correspondingly to said plurality of said sound source signal generating means, a plurality of said second switching means correspondingly to said plurality of said sound source signal generating means, first connecting means for synthesizing outputs of said plurality of first switching means to apply to said first sound output portion, and second connecting means for synthesizing outputs of said plurality of said second switching means to apply to said second sound output portion, and said music score table of said first storing means includes said duration associative data, said musical pitch associative data and said first and second switching signals for each of said plurality of said sound source signal generating means.

21. A memory cartridge in accordance with claim 20, wherein said game machine includes a first register for controlling each of said plurality of said sound source signal generating means and a second register for controlling said plurality of said first and second switching means, said first and second registers being set by said musical score table read from said first storing means.

22. A memory cartridge capable of being coupled to an electronic gaming machine, said gaming machine including a sound source which generates at least one audio signal under program control, a left channel sound output terminal for outputting left channel sound, a right channel sound output terminal for outputting right channel sound, a first switch coupled between said sound source and said left channel sound output terminal for selectively coupling an audio signal from said sound source to said left channel output terminal in response to a first switching signal, and a second switch coupled between said sound source and said right channel output terminal, said second switch selectively coupling an audio signal from said sound source to said right channel output terminal in response to a second switching signal, said memory cartridge comprising:
a first memory storage are which stores a musical score table representing a sequence of musical events, said musical score table including:
data indicating durations of a sequence of musical notes or rests,
data indicating musical pitch corresponding to musical notes in said sequence, and
first and second switching signals for controlling said first and second switches for each of said musical notes in said sequence; and
a second memory storage area for storing program control instructions which control sequential reading of said data indicating said sequence of notes and said first and second switching signals from said first storage area,
whereby, in use, said first and second switching signals read from said first storage area in accordance with said program control instructions are applied to control said first and second switches, and said duration indicating data and said musical pitch indicating data read from said first storage area are applied to control said sound source in accordance with said program control instructions, pseudo-stereophonic audio signals representing said sequence of notes being generated at said first and second sound output terminals in response to the data provided by said table.

* * * * *